United States Patent
Kitai et al.

[11] Patent Number: 5,948,069
[45] Date of Patent: Sep. 7, 1999

[54] NETWORKING SYSTEM AND PARALLEL NETWORKING METHOD

[75] Inventors: Katsuyoshi Kitai, Kokubunji; Satoshi Yoshizawa, Musashino; Toyohiko Kagimasa, Sagamihara; Fumio Noda; Yoshimasa Masuoka, both of Kodaira; Yoshifumi Takamoto, Futyu, all of Japan

[73] Assignee: Hitachi, Ltd., Tokyo, Japan

[21] Appl. No.: 08/684,572

[22] Filed: Jul. 19, 1996

[30] Foreign Application Priority Data

Jul. 19, 1995 [JP] Japan ................................ 7-182429
Dec. 21, 1995 [JP] Japan ................................ 7-333028

[51] Int. Cl.$^6$ .......................... G06F 13/38; G06F 15/17
[52] U.S. Cl. ........................ 709/240; 709/241; 370/409
[58] Field of Search ........................ 395/200.7, 200.71; 370/395, 399, 409; 702/69; 709/240, 241

[56] References Cited

U.S. PATENT DOCUMENTS

| | | | |
|---|---|---|---|
| 5,519,836 | 5/1996 | Gawlick et al. ................... | 395/200.71 |
| 5,570,355 | 10/1996 | Dail et al. . | |
| 5,610,910 | 3/1997 | Focsaneanu et al. . | |
| 5,649,108 | 7/1997 | Spiegel et al. ..................... | 395/200.71 |
| 5,651,005 | 7/1997 | Kwok et al. ........................... | 370/399 |
| 5,732,080 | 3/1998 | Ferguson et al. ...................... | 370/395 |
| 5,742,772 | 4/1998 | Sreenan ................................. | 395/200.7 |

OTHER PUBLICATIONS

Moorhead, L.; "Bandwidth on demand for video"; Lan Times; McGraw–Hill Inc.; v11 n21 p58(1), Oct. 1994.

Jeffries, R.; "ATM to the desktop: prospects and probabilities"; Telecommunications; Horizon House Publications Inc.; v28 n4 p25(5), Apr. 1994.

Slawter, B.; "SoftCell paves path to ATM"; Lan Computing; Cardinal Business Media Inc.; v5 n2 p16(1), Feb. 1994.

Architecture Technology Corp.; "Special Report: Fore Systems, Inc.'s ATM technology and products"; The Localnetter; v13 n12 p56(1), Dec. 1993.

*Primary Examiner*—Mark H. Rinehart
*Attorney, Agent, or Firm*—Antonelli, Terry, Stout & Kraus, LLP

[57] ABSTRACT

A networking method and system for performing data communication to a client computer from a server computer having a plurality of network interfaces through a network. The invention includes a LAN switch, provided between the network and the server computer. The LAN switch includes a plurality of communication paths correspondingly connected to the network interfaces of the server computer. Any one of the communication paths are usable to connect the client computer with the server computer. The invention further includes a selector for selecting one of the communication paths in accordance with a quality of service (QOS) requested by the client computer. The selector selects the communication path using information contained in a routing table in the server computer based on a network address of the network connected to the client computer. The routing table includes the address of the network connected to the client computer and addresses of network interfaces of the server computer correspondingly connected to the communication path.

40 Claims, 25 Drawing Sheets

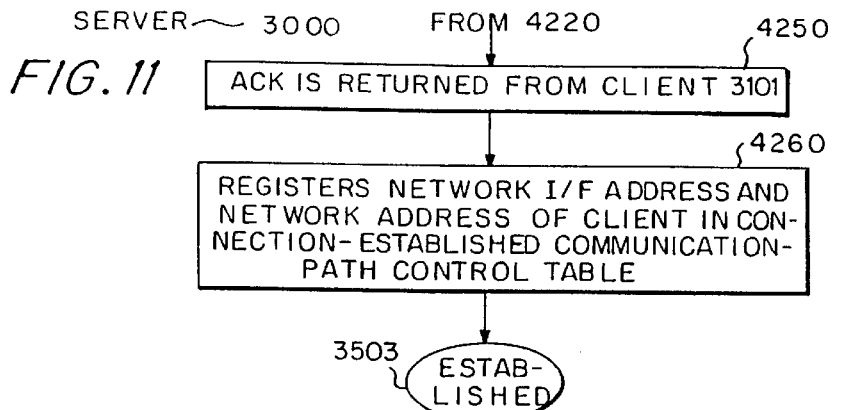
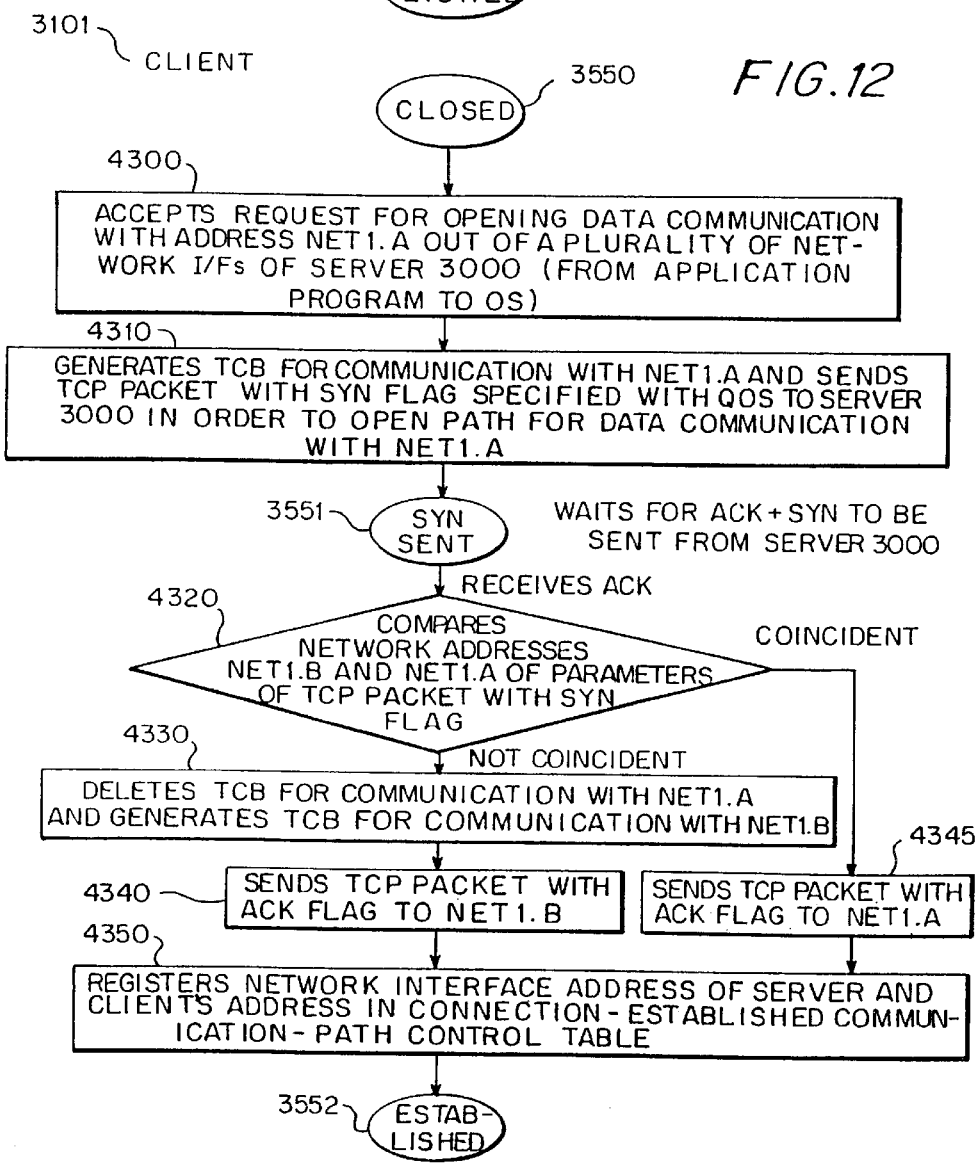

FIG. 13

ROUTING TABLE — 3000

3800

| Destination Address | Network I/F Address | Gateway Address |
|---|---|---|
| net11.* | net1.1 | net1.11 |
| net11.* | net1.2 | net1.11 |
| net11.* | net1.3 | net1.11 |
| net11.* | net1.4 | net1.11 |
| net11.* | net1.1 | net1.12 |
| net11.* | net1.2 | net1.12 |
| net11.* | net1.3 | net1.12 |
| net11.* | net1.4 | net1.12 |
| net12.* | net1.1 | net1.12 |
| net12.* | net1.2 | net1.12 |
| net12.* | net1.3 | net1.12 |
| net12.* | net1.4 | net1.12 |
| net13.* | * | net13.1 |
| net14.* | * | net14.1 |

3801–3814

TABLE FOR CONTROLLING COMMUNICATION PATH ESTABLISHED BETWEEN NET11.10 AND SERVER

| Protocol | Destination Address | Transmission Source Address |
|---|---|---|
| TCP | net11.10 | net1.2 |
| TCP | net11.10 | net1.3 |
| TCP | net11.10 | net1.4 |

3820–3823

Server

FIG. 14

ROUTING TABLE — 3101

| Destination Address | Network I/F Address | Gateway Address | |
|---|---|---|---|
| net1 | * | net11.9 | — 3901 |
| net2 | * | net11.9 | — 3902 |
| net11 | * | net11.10 | — 3903 |
| net12 | * | net 11.9 | — 3904 |
| net13 | * | net11.9 | — 3905 |
| net14 | * | net11.9 | — 3906 |

— 3900

TABLE FOR CONTROLLING ESTABLISHED COMMUNICATION PATH

| Protocol | Destination Address | Transmission Source Address | |
|---|---|---|---|
| TCP | net1.2 | net11.10 | — 3911 |
| TCP | net1.3 | net11.10 | — 3912 |
| TCP | net1.4 | net11.10 | — 3913 |
| TCP | net13.10 | net11.10 | — 3914 |
| TCP | net 14.10 | net11.10 | — 3915 |

— 3910

CLIENT

FIG. 16

EXAMPLE OF PROGRAM OF SERVER 3000

```
define SERV_TCP_PORT  6001                    ~9001 fd = socket (AF_INET, SOCK_STREAM, 0) ;         ~9002 serv_addr.sin_family = AF_INET ;                ~9003
serv_addr.sin_addr.s_addr = hton1 (INADDR_ANY) ; ~9004
serv_addr.sin_port = htons (SERV_TCP_PORT) ;    ~9005 bind (fd, (struct sockaddr *) &serv_addr,       ~9006
      sizeof (serv_addr)) ;

listen (fd, 5) ;                                ~9007 for ( ; ; ) {                                                   ~9008
    newfd = accept (fd, (struct aockaddr *)
                    &cli_addr, &clilen) ;       ~9009
    childpid = fork () ;                        ~9010
    if (childpid = = 0) {                       ~9011
        close (fd);        /* child process */  ~9012
        send and receive data to and from CLIENT; ~9013
        exit (0);                               ~9014
    }
    close(newfd) ;         /* parent process */ ~9015
}
```

EXAMPLE OF PROGRAM OF CLIENT 3101

```
#define SERV_TCP_PORT  6001                    ~9050
#define SERV_HOST_ADDR  net1.1                 ~9051
#define QOS  [SERVICE_CLASS,                    ~9052
             PEAK_BANDWIDTH,AVERAGE_BANDWIDTH]

fd = socket (AF_INET, SOCK_STREAM, 0),          ~9053 serv_addr.sin_family = AF_INET,                 ~9054
serv_addr.sin_addr.s_addr = hton1 (SERV_HOST_ADDR); ~9055
serv_addr.sin_port = htons(SERV_TCP_PORT) ;     ~9056
serv_addr.qos = QOS;                            ~9057 connect (fd, (struct sockaddr *) &serv_addr,    ~9058
         sizeof(serv_addr));

send and receive data to and from SERVER;       ~9059 close (fd) ;                                    ~9060
exit (0) ;                                      ~9061
```

FIG. 23

5700: TCP PACKET WITH SYN FLAG IS SENT FROM PORT #0, VC = 11 (3074) TO NET1.1 (3011).

5710: TRANSLATION TABLE (5000) IS REFERRED TO AND PORT #1 = 1 IS OBTAINED.

5720: VC = 1 IS SELECTED AND (PORT #0, VC = 11) < - > (PORT #1, VC = 1) IS REGISTERED IN ADDRESS SWITCHING TABLE 5010.

5730: WHEN SERVER 3000 SELECTS PORTS #2, #3, AND #4 AS COMMUNICATION PATHS, SERVER 3000 RESERVES VCs OF THREE PORTS (#2, VC=1), (#3, VC=1), AND (#4, VC=1) FOR LAN SWITCH 3050.

5740: SERVER 3000 RETURNS ACK AND SYN FROM PORT #1, VC = 1 TO PORT #0, VC = 11 OF CLIENT 3011. (ACCOMPANIED BY PARAMETER ADDRESSES NET1.2, NET1.3, AND NET1.4 OF SYN)

5750: SERVER 3000 SENDS ENTRY DELETION SIGNAL OF (#0,11) < - > (#1,1) OF TABLE 5010 TO LAN SWITCH 3500.

5760: CLIENT 3011 RETURNS ACK THROUGH THREE PATHS AND NEWLY ESTABLISHES THREE VIRTUAL CHANNELS UP TO LAN SWITCH 3050 IN ORDER TO ESTABLISH CONNECTIONS.

5770: PORT NUMBERS ARE OBTAINED FROM DESTINATION NET1.2, NET1.3, AND NET1.4 AND TABLE 5000 AND LAN SWITCH 3050 ESTABLISHES SWITCHING OF RESERVED (#2,1), (#3,1), AND (#4,1) AND THREE VCs OF (#0,12), (30,13), AND (30,14)

5780: TO BE UPDATED TO ADDRESS SWITCHING TABLE 5011(b) OF LAN SWITCH 3050.

5790: ESTABLISHMENT OF THREE CONNECTIONS.

FIG. 24
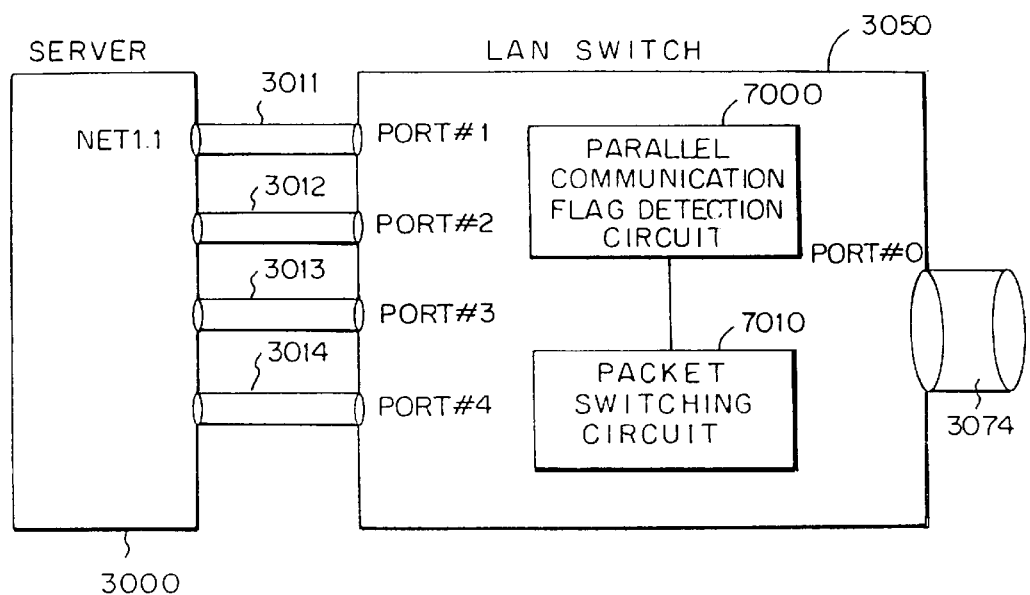
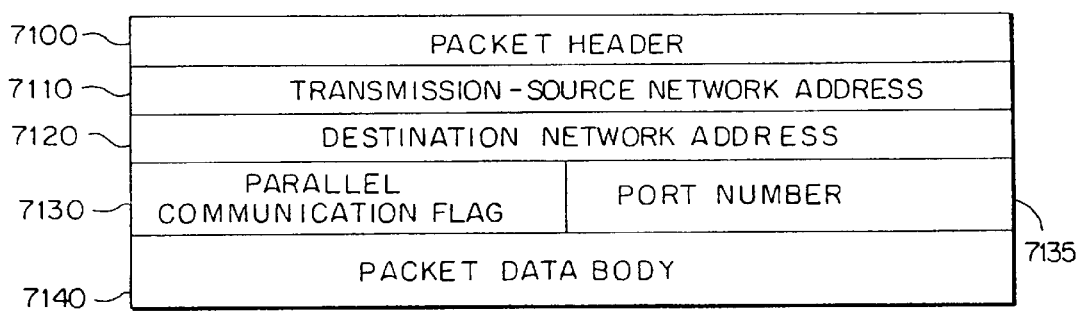

NETWORKING SYSTEM AND PARALLEL NETWORKING METHOD

BACKGROUND OF THE INVENTION

The present invention relates to a networking system and a parallel networking method of a computer provided with a plurality of network interfaces. More particularly the present invention relates to a networking system required to meet various kinds of quality of service (QOS), like an ATM network.

FIG. 15 illustrates a conventional network connection of a server provided with a plurality of network interfaces. As a server provided with a plurality of network interfaces, an NFS server of Auspex Inc. and storage server of Maximum Strategy Inc. are known.

In FIG. 15, numeral 500 represents a server; 501, 502, and 503 represent network interfaces; 505 represents a routing table; 510, 520, and 530 represent networks respectively connected to network interfaces 501, 502, and 503 numerals 511 to 513, 521 to 523, and 531 to 533 represent clients (workstations or PCs) respectively connected to networks 510, 520, and 530. Numeral 540 represents a network connected to a public network 570, and 541 represents a client connected to the network 540. The network interfaces of a server each substantially comprises an interface card and related software.

The server 500 is connected with the public network 570 through a gateway 550 connected to the network 510 and a PBX (Private Branch Exchange) 560. Network addresses net1.1, net1.2, and net1.3 of the network 510 are assigned to the clients 511, 512, and 513 respectively and a network address net1.11 of the network 510 is assigned to the network interface 501. The clients 511, 512, and 513 can perform data communication with the server 500 only by using the address net1.11, that is, only through the network 510. Similarly, the clients 521, 522, and 523 perform data communication with the server 500 through the network 520 and the clients 531, 532, and 533 perform data communication with the server 500 through the network 530. The client 541 connected to the public network 570 performs data communication with the server 500 through the PBX 560, gateway 550, and network 510. The clients connected to the LAN1 to LAN3 can perform data communication only through the previously-connected networks 510, 520, and 530.

To transfer data from the server 500 to the clients 511, 512, and 513, the clients 521, 522, and 523, or the clients 531, 532, and 533; one of the network interfaces 501, 502, and 503 (networks 510, 520, and 530) is used in accordance with the designation of the routing table 505 controlled by the operating system of the server 505. To transfer data from the server 500 to the client 541, the gateway 550 connected to the network 510 is selected in accordance with the designation of the routing table 505 and the gateway 550 sends a packet sent from the server 500 to the network 540. In this case, only the network interface 501 is used.

FIG. 2 shows the structure of a conventional routing table. In FIG. 2, numerals 161 to 165 represent items of entries of the routing table. Each entry is connected to a linear list in which the headers are the entries 100 to 150 determined by the values obtained by translating the destination addresses by a hash function 180. Using the destination address as the keys, the linear list is searched, the entry such that the destination address 161 coincides with the key is found. A packet is sent from the gateway address 162 which is the network address of the first found entry. For example, in FIG. 15, the server 500 can communicate with the client 541 through the network interface 501, using the network 510. To communicate with each of the clients connected to the networks 510, 520, and 530 through the network interfaces 501, 502, and 503 of the server 500, the network addresses net1.11, net2.11, and net3.11 are directly specified instead of the gateway 162.

Details of the routing table are shown in "Internetworking with TCP/IP, Volume I, II" (Prentice Hall) written by Douglas E. Comer et al. and "The Design and Implementation of the 4.3DSD UNIX Operating system" (Addison Wesley) written by S. J. Leffler et al. Thus, the routing table has a function to clarify the next network address of the gateway or the like to which a packet is sent next, using the destination address of the packet as a key.

Moreover, it is possible to obtain pieces of information 171 to 176 about network interfaces reaching a gateway by a pointer 163 for the entry into the network interface information table in routing table entries. The information about the network interface includes the maximum transmission unit (MTU) of the network interface 172 and the number of input and output packets 173 and 174 passing through the network interface.

The above described conventional technology has disadvantages being that it is impossible to dynamically select a network interface and balance the load in accordance with the load state of the network interface in the case of data communication between a client and the server because only one network interface connected with the client can be used though a plurality of network interfaces of the server are present. Thus, various kinds of quality of service (QOS) of the client cannot be satisfied. For example, when there is a requirement to communicate multimedia data such as voices, images, or data have increased recently, it is difficult to meet the quality of service (QOS) requested by clients because a considerably large capacity is necessary and thereby, a load is concentrated on one network interface.

Moreover, the above-described conventional technology has further disadvantages being that the bandwidth of the network interface of a client cannot be fully used because only one network interface can be used to transfer data from the server to the client when the bandwidth of the client's network interface is larger than that of each network interface of the server.

SUMMARY OF THE INVENTION

It is an object of the present invention to provide a networking system and a parallel networking method, wherein a server is provided with a plurality of network interfaces, and communication can be held by using a network interface satisfying the quality of service (QOS) requested by the client, or by using a plurality of network interfaces in parallel.

It is another object of the present invention to provide a networking system and a parallel networking method, wherein a client is connected to the server having network interfaces through a network like an ATM network such that bandwidths can be reserved, and it is possible to use a network interface satisfying the quality of service (QOS), requested by the client when the connection is established.

To achieve the above objects, the present invention holds network interface addresses which are the addresses of the network interfaces in each entry of the routing table of the first computer (server).

Moreover, the present invention is provided with quality-of-service (QOS) holding apparatus for holding the used sate of each network interface. Furthermore, the present invention is provided with apparatus for specifying the QOS parameters specified when the second computer (client) opens the communication path connected with the first computer.

Specifically, when the second computer (client) requests the first computer (server) to open a communication path, the first computer selects at least one entry where the final destination network address agree with the network address of the second computer out of the entries of the routing table, compares the QOS holding apparatus of the network interface specified by the network interface address of the selected entry of the routing table with the QOS parameters specified by the second computer, selects at least one network interface so that the condition specified by the QOS parameters can be satisfied, and sends a packet to a gateway through the network interface. Moreover, the first computer notifies the second computer of the network addresses of all selected network interfaces together with a synchronization (SYN) packet to be sent when the communication path is opened.

Moreover, when the second computer is provided with a network interface having a large bandwidth, data communication can be performed using a plurality of network interfaces of the first computer in parallel. When a client performs data communication with the server provided with a plurality of network interfaces, it is preferable that the server can select a network interface in accordance with the dynamic load magnitude etc. of each network interface so that the quality of service (QOS) requested by the client can be satisfied.

According to present invention, first, a virtual channel such that a plurality of bandwidths of a LAN switch like an ATM (Asynchronous Transfer Mode) switch can be reserved is used so that the server can perform data communication with the client by using different network interfaces, and the network-interface addresses are added to the conventional routing table. The network address of a gateway for sending a packet is obtained from both the client's network address and the network interface addresses so that different paths can be selected.

Moreover, in the present invention (a) the server is provided with a QOS control table holding statistical information about the bandwidth of a virtual channel and the dynamic load to refer to the table entries when establishing a data communication path is requested. Further, in the present invention (b) conventional three-way handshake is expanded, the network interface address of a connection selected by the server as an SYN parameter is attached when the server returns SYN (synchronization)/ACK (acknowledgment) to a client at the time of establishing a connection, and the client establishes a connection by returning ACK to the network interface address specified by SYN and using the network interface selected by the server so that subsequent data communication can be performed.

In the case of a client provided with a network interface having a large bandwidth, in order to perform data communication by using a plurality of network interfaces of the server in parallel, the number of network interfaces selected by the server as SYN parameters and each network address are attached when the server returns SYN/ACK to the client at the time of establishing a connection by three-way handshake. Then, and the client returns ACK to all network addresses specified by SYN and establishes a connection by using the network interface selected by the server so that subsequent data communication can be performed.

Furthermore, packets are divided or integrated between the protocol layer and the application layer so that parallel communication can be realized without changing the application program.

BRIEF DESCRIPTION FOR THE DRAWINGS

The present invention will be more apparent from the following detailed description, when taken in conjunction with the accompanying drawings, in which:

FIG. 11 is a flow chart for explaining an embodiment of the server operation in the connection establishing method of the present invention;

FIG. 12 is a flow chart for explaining an embodiment of the client operation in the connection establishing method of the present invention;

FIG. 13 is an illustration for explaining an embodiment of a routing table of the server in the networking method of the present invention;

FIG. 14 is an illustration for explaining a routing table of the client in the networking method of the present invention;

FIG. 16 is an illustration showing embodiments of a client program and a server program in an application program;

FIG. 23 is a flow chart for explaining an embodiment of the LAN switch operation in the parallel connection establishing method of the present invention;

FIG. 24 is a block diagram of the LAN switch and an illustration showing an embodiment of a packet header format in the second parallel connection establishing method of the present invention;

DETAILED DESCRIPTION OF THE PREFERRED EMBODIMENTS

(1) Embodiment 1

Embodiment 1 of the present invention will be described below in detail.

Figure 3:
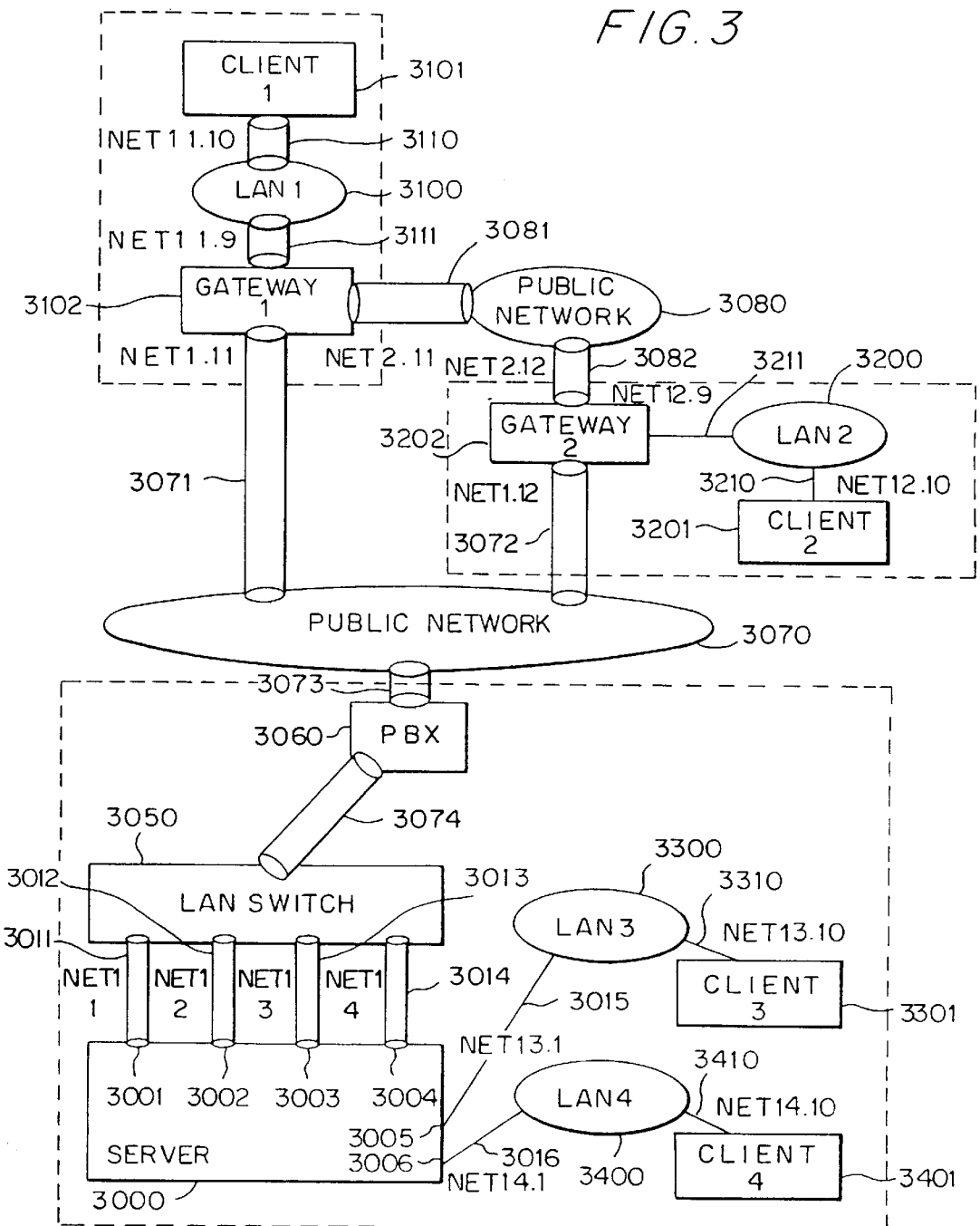
FIG. 3 is a whole block diagram of the network connection system of the present invention.

FIG. 3 illustrates the entire block diagram of the network connection system of embodiment 1 of the present invention. In FIG. 3, numeral 3000 represents a server computer to which the present invention is applied; 3050 represents a LAN switch such as an ATM (Asynchronous Transfer Mode) switch; 3060 represents a PBX (Private Branch Exchange); 3070 represents a public network; 310, 3200, 3300, and 3400 represent LANs (Local Area Networks); 3101, 3201, 3301, and 3401 represent client computers; and 3102 and 3202 represent gateway computers to which the present invention is applied.

The server 3000 includes a single computer such as a workstation or a parallel processor, which is connected to communication paths 3011, 3012, 3013, and 3014. These communication paths are connected with the LAN switch 3050. Moreover, the server 3000 is connected to communication paths 3015 and 3016 through network interfaces 3005 and 3006 and these communication paths are connected with LANs 3300 and 3400 respectively. The LAN switch 3050 includes a switch such as an ATM switch or a fiber channel, which is connected with the PBX 3060 through a communication path 3074. The PBX 3060 is connected to the public network 3070 through a communication path 3073. In this case, the communication paths 3011, 3012, 3013, 3014, 3074, and 3073 each includes one or more reservable-bandwidth virtual channels like an ATM. The LAN switch 3050 and the PBX 3060 perform switching between virtual channels. It should be noted that a plurality of virtual channels are present between the LAN switch and the server.

The clients 3101, 3201, 3301, and 3401 each includes a computer such as a PC or workstation, which are connected with the LANs 3100, 3200, 3300, and 3400 through communication paths 3110, 3210, 3310, and 3410 respectively. The gateway 3102 is a computer for internetworking, which is connected with the LAN 3100 and public networks 3070 and 3080 through the communication paths 3111, 3071, and 3081. The gateway 3202 is also a computer for internetworking, networks, which is connected with the LAN 3200 and public networks 3070 and 3080 through the communication paths 3211, 3072, and 3082. A router and a switch are used as internetworking means in addition to a gateway.

In the case of this embodiment, a network address net1.* is assigned to a network including the LAN switch 3050 and public network 3070, a network address net2.* is assigned to a network including the public network 3080, and network addresses net11.*, net12.*, and net13.* are assigned to the LAN 1, LAN 2, LAN 3, and LAN 4 respectively. Network addresses net1.1, net1.2, net1.3, net1.4, and net13.1, and net14.1 are assigned to the network interfaces 3001 to 3006 of the server 3000 connected with the communication paths 3011 to 3016; net11.10, net12.10, net13.10, and net14.10 are assigned to the clients 3101, 3201, 3301, and 3401; net11.9, net1.11, and net2.11 are assigned to the network interfaces of the gateway 3102 respectively, and net12.9, net1.12, and net2.12 are assigned to the network interface of the gateway 3202 respectively.

In FIG. 3, the server 3000 can select a plurality of paths when performing data communication with the client 3101. The server 3000 can communicate with the client 3101 through the LAN switch 3050, PBX 3060, public network 3070, gateway 3102, and LAN 3100, using any one of the network interfaces 3001, 3002, 3003, and 3004. Moreover, there is a path via the gateway 3202, public network 3080, gateway 3102, and LAN 3100 as another path from the public network 3070 up to the client 3101.

Embodiment 1 of the present invention will be described below, using a case in which the client 3101 performs connection-oriented data communication with the server 3000 by using TCP/IP protocol. First, FIG. 16 illustrates an embodiment of program. This program is obtained by extending a program using a socket described in "UNIX network programming" (Prentice Hall) written by W. D. Stevens.

Numerals 9001 to 9015 represent instructions of the program to be executed by the server 3000 and 9050 to 9061 represent instructions of the program to be executed by the client 3101. The server 3000 performs generation of a socket (9002) and addressing of the socket, and thereafter, waits for a request for establishing a connection from any client (9004) in accordance with a listen( ) call (9007). The client 3101 generates a socket (9053) and thereafter, specifies net1.19 (9051) which is one of the network addresses of the server 3000 (9055) to request establishing a connection with the server in accordance with a connect( ) call (9058).

When establishing a connection with the server is requested, the QOS of the communication path is specified (9057). The QOS, as shown in 9052, includes the following three items: service class, peak bandwidth (Mbps), and average band width (Mbps). The service class includes the following three types: BE (Best Effort), GB (Guaranteed Burst), and GS (Guaranteed Stream). BE is a normal data communication, in which data throughput changes with the congestion degree of the communication path. GB is a data communication for burst transfer, which guarantees the throughput for burst transfer as much as possible. GB also makes it possible to change the reservations of bandwidths before starting burst transfer. GS is a stream data communication for video data or audio data, which guarantees a previously secured bandwidth. It also makes it possible to turn off service class designation.

When the client 3101 requests opening a communication path in response to a connect(**) call and the server 3000 accepts the client's request, a communication path between the client and the server is established in response to an accept(\*\*) call (9009). The server assigns a descriptor newfd of the socket used for the newly established communication path (9009) and generates a child process (9010), and data communication is performed between the child process and the client (9013). A parent process returns to a waiting state in order to accept a request from another client (9015, 9008). Moreover, when a communication path is established (9058), the client 3101 also performs data communication with the server (9059).

Then, an embodiment of a method for establishing a connection between the client 3101 and the server 3000 in a TCP/IP protocol layer will be described below, referring to FIGS. 4, 1, 9, 10, 11, and 12.

Figure 4:
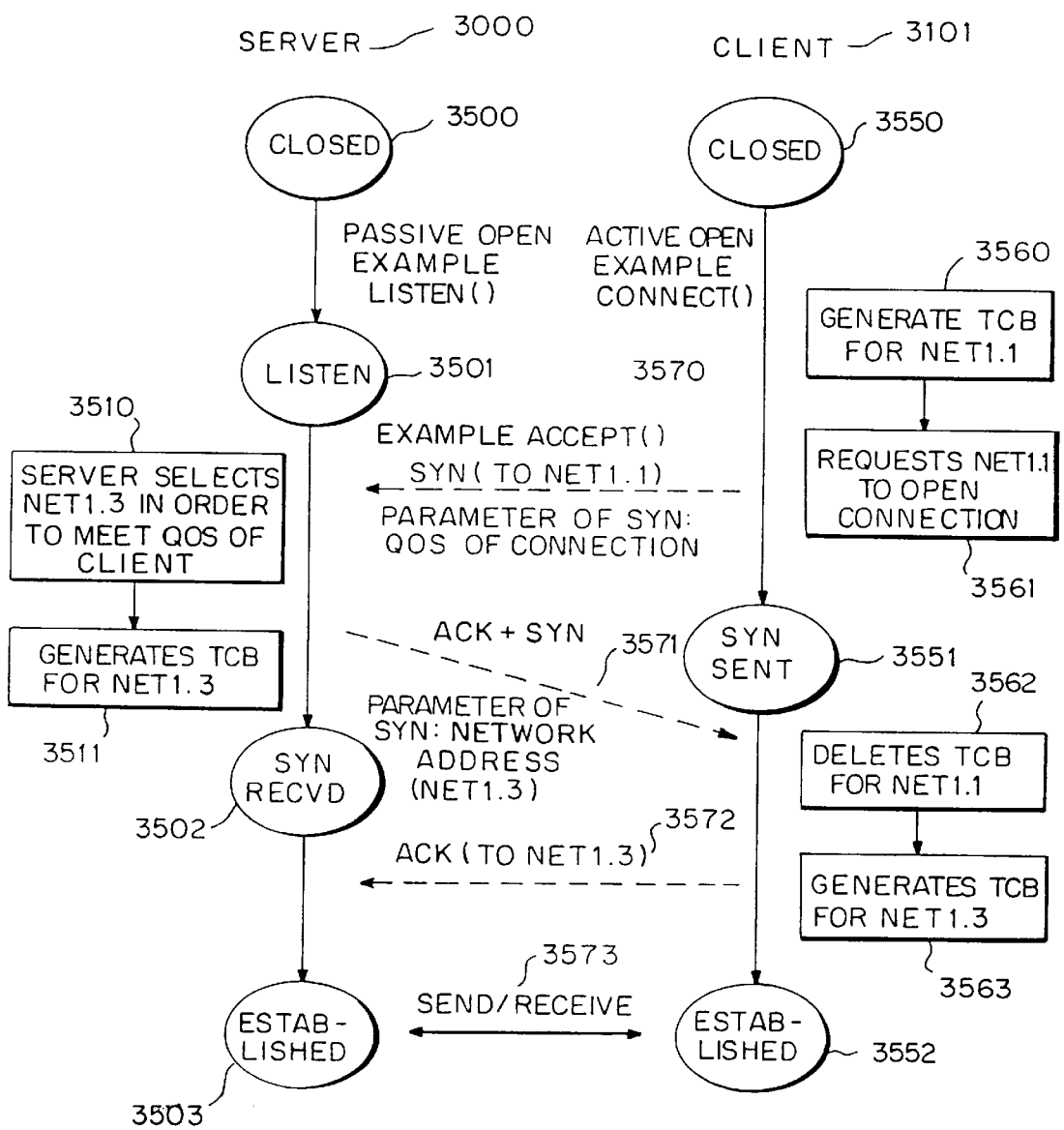
FIG. 4 is an illustration showing an embodiment of the connection establishing method of the present invention.

First, the outline of the processing of the method for establishing a connection will be illustrated below, referring to FIG. 4. In FIG. 4, numeral 3500, 3501, 3502, 3503, 3550, 3551, and 3552 represent the states of TCP protocol and 3570, 3571, and 3572 represent a three-way handshake for establishing a connection between the client 3101 and the server 3000. The original three-way handshake is described in "Internetworking with TCP/IP, Volume I, II" (Prentice Hall) written by Douglas E. Comer et al.

The server 3000 in CLOSED state (3500) changes to LISTEN state when the listen (\*\*) call in the program shown in FIG. 16 is executed (9007) and waits for a request for opening a connection from a client (3501). When the connect (\*\*) call in the program shown in FIG. 16 is executed (9058), the client 3101 in CLOSED state 3550 generates a control block TCB (Transmission Control Block) necessary to control the data communication with the network address net1.1 which is one of the network interfaces of the server 3000 (3560). Then, the client 3101 sends a TCP packet in which an SYN (synchronization) flag is set to the server 3000 in order to request net1.1 to open a connection (3561). In this case, the client 3101 sends the QOS (quality of service) of the connection to the server 3000 as the parameters of the TCP packet with the SYN flag (3570). The QOS, as shown by 9052 in FIG. 16, comprises the following three items: service class, peak bandwidth (Mbps), and average bandwidth (Mbps). After sending the TCP packet with the SYN flag, the client 3101 changes to SYN SENT state (3551).

When the server in LISTEN state accepts the TCP packet with the QOS (quality of service), it seeks a network interface meeting the QOS of the client 3101. An embodiment of a procedure for selecting a network interface will be described later. Hereafter, an example will be described below in which the network interface 3003 and the interface of the network address net1.3 in FIG. 3 are selected (3510). The server 3000 generates a TCB (Transmission Control Block) corresponding to the network address net1.3 (3511). The TCB holds the network address of the client 3101, the network address net1.3 of the selected network interface of the server 3000, and the communication protocol name TCP.

After generating the TCP, the server 3000 sends a TCP packet with an ACK (acknowledgment) flag acknowledging the SYN from the client (3571), and a TCP packet with an SYN flag to the client 3101 and brings the server to SYN RECVD state (3502). The network address net1.3 is added to the SYN flag as a parameter. When the client 3101 accepts the TCP packet with the SYN flag to which the network address net1.3 is added as a parameter, it deletes the TCB generated for net1.1 (3562) and generates a TCB corresponding to net1.3 (3563). Then, the client 3101 sends the TCP packet with an ACK flag to net11.3 (3572) and thereafter, it changes to ESTABLISHED state (3552). After accepting the ACK, the server 3000 is also brought to ESTABLISHED state (3503). Hereafter, it is possible to perform communication between the client and the server in accordance with SEND/RECEIVE (3573).

Figure 9:
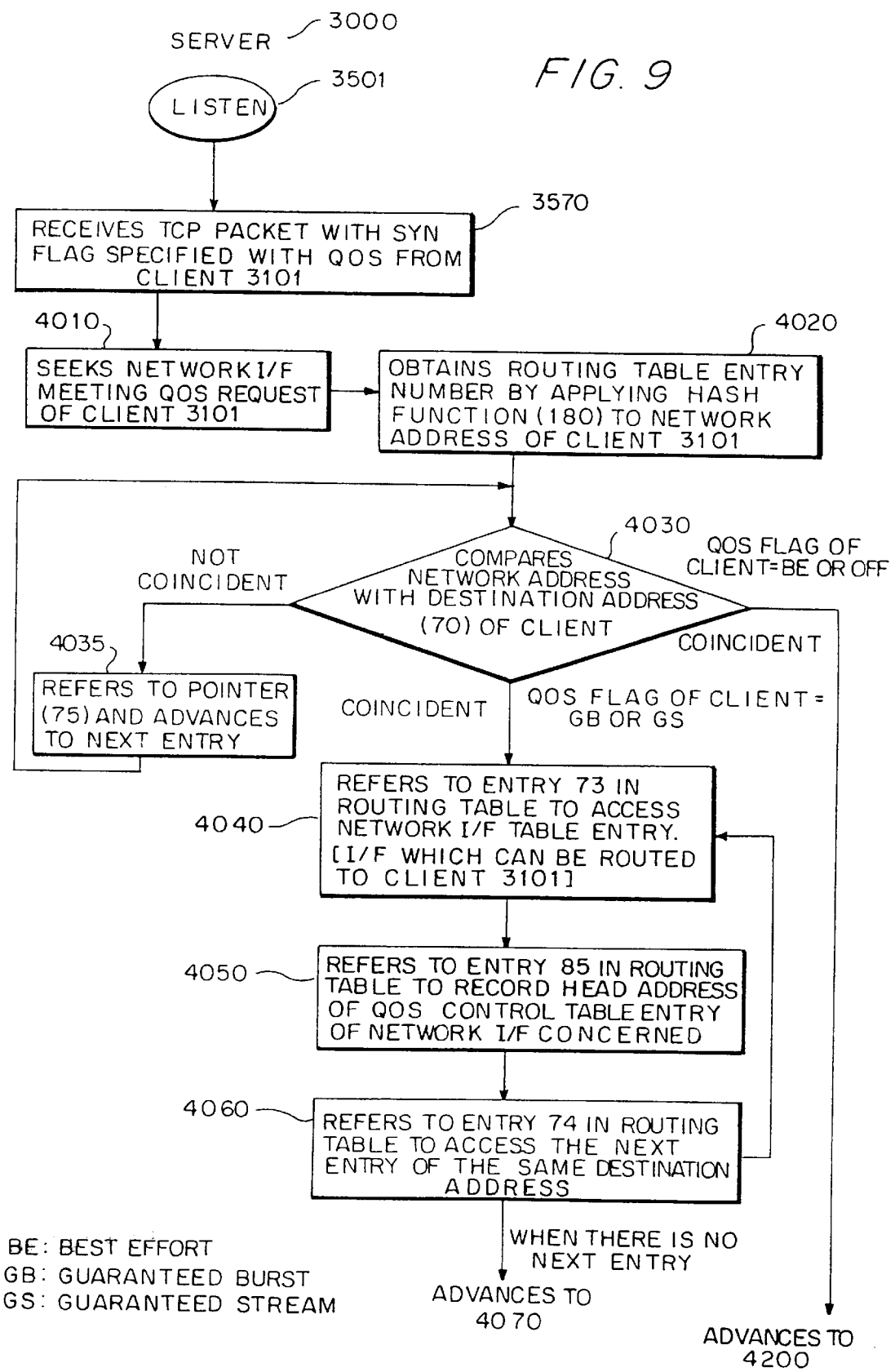
FIG. 9 is a flow chart for explaining an embodiment of the server operation in the connection establishing method of the present invention.
Figure 10:
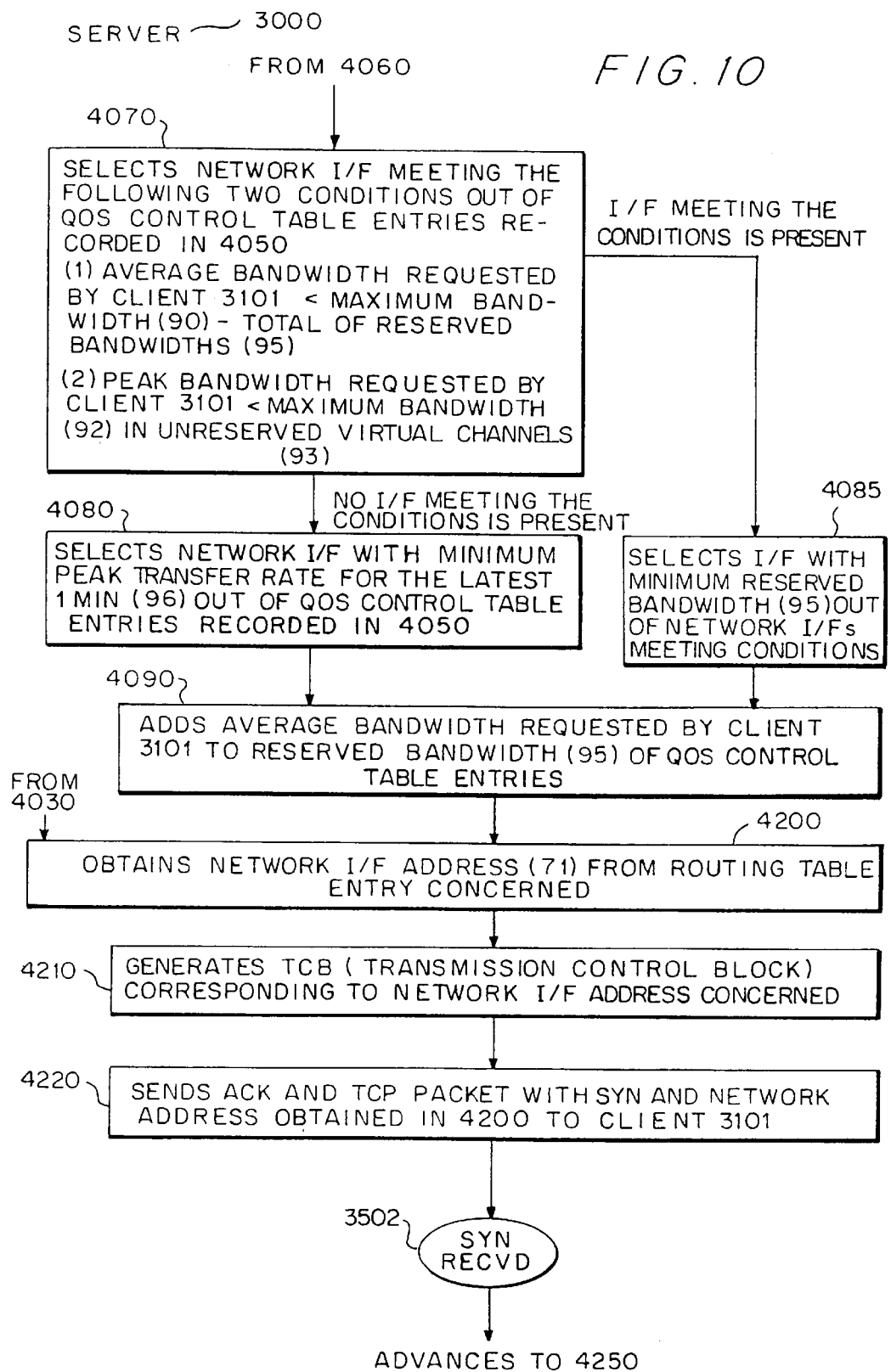
FIG. 10 is a flow chart for explaining an embodiment of the server operation in the connection establishing method of the present invention.
Figure 15:
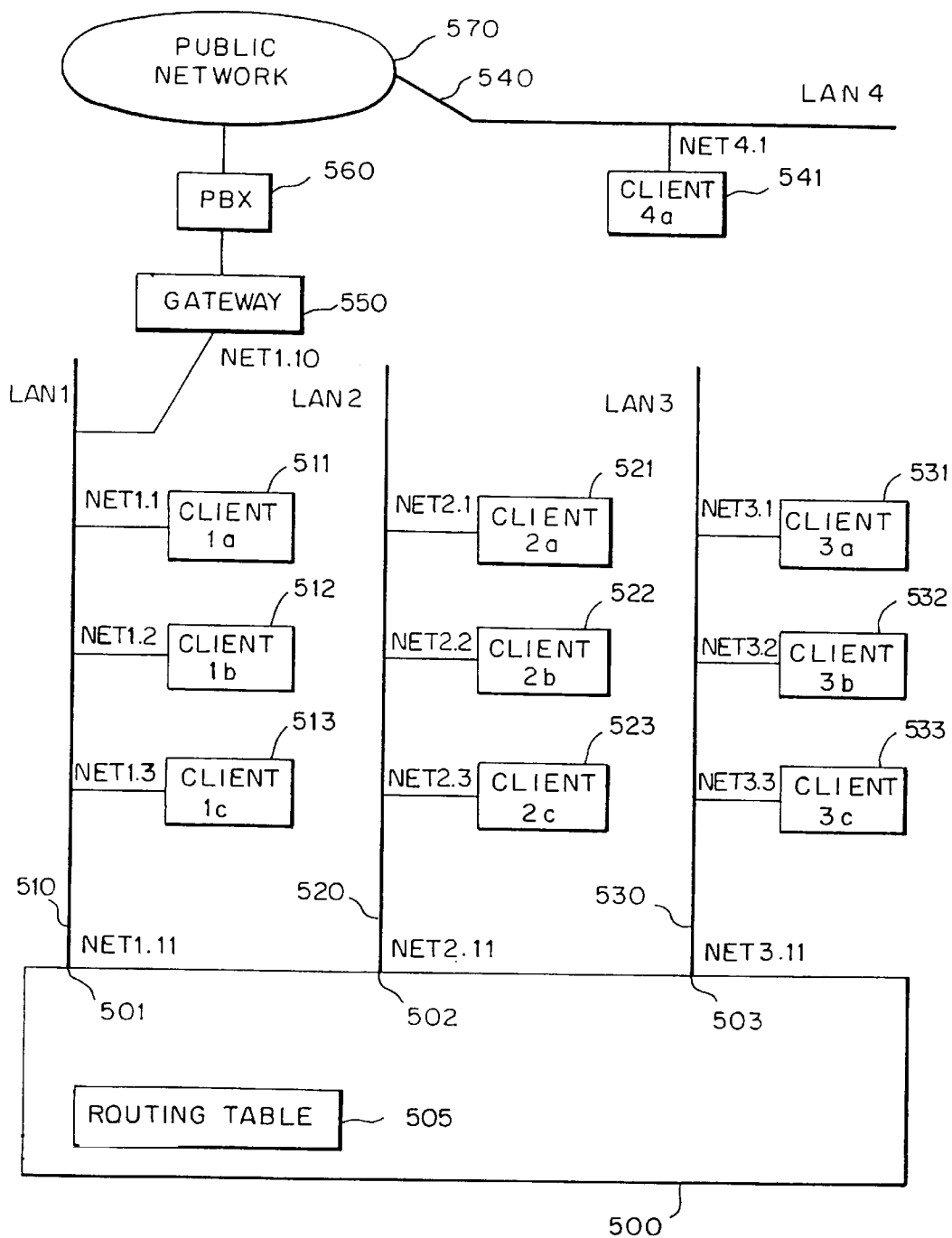
FIG. 15 is an illustration showing a network connection in a conventional server.

Details of the method of the present invention for establishing a connection shown above referring to FIG. 4 will be described below referring to FIGS. 1, 9, 10, 11, and 12. FIGS. 9, 10, and 11 are flow charts of the processing by the server 3000 in and after the state of waiting for a request for establishing a connection from a client in LISTEN state (3501), FIG. 12 is a flow chart of the processing by the client 3101, and FIG. 1 shows a data structure used to select a network interface.

In FIG. 9, when the server 3000 in LISTEN stage (3501) accepts a TCP packet with an SYN flag and QOS designation from the client 3101 (3507), it fulfills the QOS request of the client 3101 and performs the following processing in order to select a network interface capable of balancing the load of the network interface of the server 3000 (4010).

A procedure for selecting a network interface will be described below referring to FIG. 1. FIG. 1 illustrates the routing table, network interface information table, and QOS control table of embodiment 1 of the present invention. The server 3000 refers to these tables when selecting a network interface.

Figure 1:
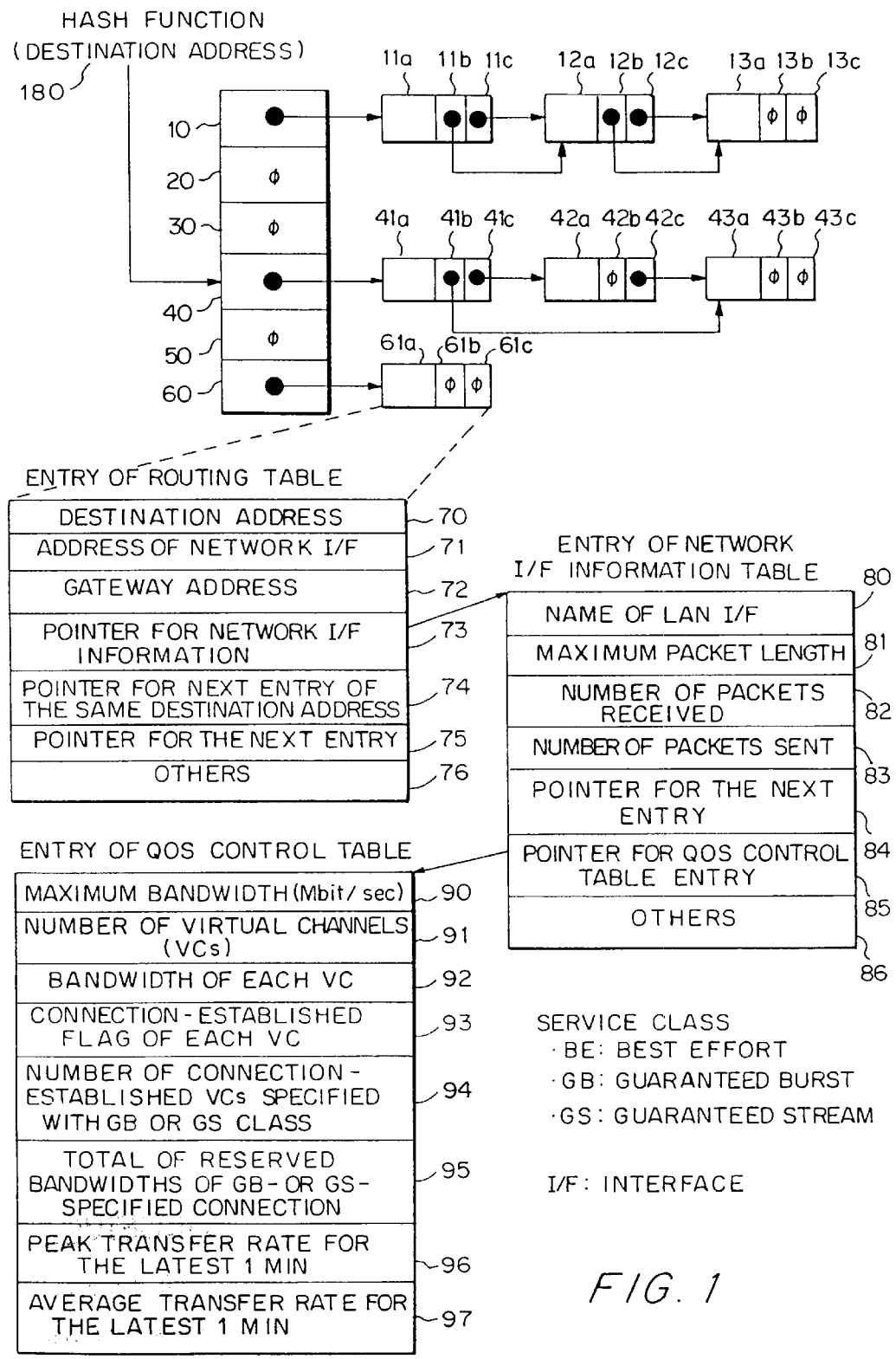
FIG. 1 is an embodiment of the present invention showing a routing table and its entries, entries of a network interface information table, and entries of a QOS (quality of service) control table.

In FIG. 1, numerals 10 to 60 are headers of the corresponding entries of the routing table. The network address (or destination address when viewed from the server 3000) net11.10 of the client 3101 is translated by a hash function to trace the routing-table entries. Each entry of the routing table includes a destination address 70 of a client which is the destination to which a packet is finally sent, a network address 71 of the network interface of the server 3000 capable of reaching a destination address, a network address 72 of a gateway for next transmitting a packet in order to reach the destination address 70, a pointer 73 for a network interface information table holding the information about the network interface connected with the gateway and the QOS information about the network interface, a pointer 74 for searching routing-table entries having the same destination at a high speed, a pointer 75 for generating a list of routing-table entries, and others 76.

Each entry of the network interface information table includes the name 80 of a network interface, the maximum packet length (MTU: Maximum Transmission Unit) 81 to be processed by the network interface concerned, the number of received packets 82 and the number of sent packets 83 holding the accumulated number of packets sent or received through the network interface concerned, a pointer 84 for generating a linear list of entries of the network interface information table, a pointer 85 for QOS control table entries holding the QOS information and dynamic load information about the network interface concerned, and others 86.

Each entry of the QOS control table includes the maximum bandwidth (Mbps) 90 of the network interface concerned, the number of virtual channels (VC) 91, a bandwidth (Mbps) 92 assigned to each virtual channel, a flag 93 indicating whether the connection of each virtual channel is established or not, the number of virtual channels 94 of which the service class is GB or GS and through which a connection is established, the total value (Mbps) of bandwidths 95 of which the service class is GB or GS and with which a connection is established and reserved, the peak transfer rate (Mbps) 96 for the latest 1 min, and an average transfer rate (Mbps) 97 for the latest 1 min.

An embodiment of the whole routing table of the server 3000 in the network connection structure of FIG. 3 will be described below referring to FIG. 13. In FIG. 13, numeral 3800 represents the whole routing table and numeral 3801 to 3814 represent a destination address (70) in routing-table entries, a network address (71) of a network interface, and a network address (72) of a gateway, respectively.

The network address of the LAN 3100 including the client 3101 is expressed by the destination address net11.* (3801 to 3808) and the network addresses of the LANs 3200, 3300, and 3400 are expressed by the destination addresses net12.* (3809 to 3812), net13.* (3813), and net14.* (3814), respectively. An entry 3801 shows that routing to net11.* is realized via the gateway 3102 (network address net1.11), using the network interface 3001 (network address is net1.1) of the server 3000. Similarly, entries 3802, 3803, and 3804 respectively show that routing to net11.* is realized via the gateway 3102, using the network interfaces 3002, 3003, and 3004 (network addresses are net1.2, net1.3, and net1.4) and entries 3805, 3806, 3807, and 3808 respectively show that routing to net11.* is realized via the gateway 3202 (the network address is net1.12) by using the network interfaces 3001, 3002, and 3004 (the network addresses are net1.1, net1.2, net1.3, and net1.4). As described above, the network interface and the gateway address capable of reaching net11.* are previously set in the routing table and a data communication path (route) is selected when a connection is established in accordance with the QOS requested by the client 3101, the load of the network interface of the server 3000, and the load of the LAN switch 3050. Similarly, entries 3809, 3810, 3811, and 3812 respectively show that routing to net12.* is realized via the gateway 3202 (the network address is net1.12), using the network interfaces 3001, 3002, 3003, and 3004 (the network addresses are net1.1, net1.2, net1.3, and net1.4).

In FIG. 3, routing to net12.* is also realized even via the gateway 3102. According to the setting of the routing table in FIG. 13, however, routing via the gateway 3102 is not made. The network addresses of entries 3813 and 3814 are unspecified because the server 3000 has only one network interface for the routing to net13.* and to net14.* and therefore, it is unnecessary to specify the routing. A conventional routing table does not include the column of the network addresses of the network interfaces.

When a connection is established, the client (destination address) with which data communication is performed, and the network address (transmission source address) of a network interface of a server are entered into the table 3820. In the case of the table 3820 of FIG. 13, connections (3821, 3822, 3833) are established between the client 3101 and the network interfaces 3002, 3003, and 3004 of the server 3000.

In FIG. 9, the server 3000 applies a hash function to the network address net11.10 of the client 3101 to obtain the header 40 of the list of routing table entries (4020). The server traces the routing table entry from the header 40 to check if the destination address 70 of the entry agree with the network address net11.10 or the subnetwork address net11 of the client 3101 (4030). If not, the server traces the pointer 75 for the next entry of the routing table entry, advances to the next entry (4035), and repeats the operation until a routing table entry of the destination address 70 agreeing with the network address net11.10 or the subnetwork address net11 of the client 3101 is found (4030 and 4035).

An example will be described below in which in the routing table an entry having the same address is found.

(A) When the service class requested by the client 3101 is GB (Guaranteed Burst) or GS (Guaranteed Stream), the server 3000 checks network interface information table entries from the pointer 73 in routing table entries (4040) and records the value of the pointer 85 for the QOS control table entries in the network interface control table entries in a work memory area (4050). Then, the server obtains all routing table entries having the same destination address by using the pointer 74 in the routing table entries (4060) and records the value of the pointer 85 for the QOS control table entries in the network interface information table entries in the work memory area (4050). In the case of this embodiment, eight entries, from the entry 3801 to the entry 3808, are selected according to the routing table 3800 in FIG. 13.

In FIG. 10, the server 3000 traces the pointer for the QOS control table entries recorded in 4050 to check the records in the QOS control table entries, and selects a network interface of the server 3000 meeting the following two conditions (4070).

(1) The average bandwidth requested by the client 3101 is smaller than the value obtained by subtracting the total of reserved bandwidths (95) from the maximum bandwidth (90).

(2) The peak bandwidth requested by the client 3101 is smaller than the maximum bandwidth among the bandwidths of unreserved virtual channels (93).

Unless any network interface meeting the conditions is found, the server 300° selects a network interface having the minimum peak transfer rate (96) for the latest 1 min (4080). Though not illustrated in FIG. 10 or 4, when it is impossible to fulfill the request of the client 3101, it is also possible to hold a conference between the server 3000 and the client 3101, that is, the server 3100 notifies the client 3101 in SYN SENT state that it is impossible to fulfill the request of the client 3101 as a parameter of a TCP packet with an ACK flag and confers with the client 3101 about the QOS, and the client 3101 specifies the QOS again and sends a TCP packet with a SYN flag to the server 3000 again (3570), and the server 3000 seeks a network interface in accordance with the new QOS (3510).

Referring back to FIG. 10, when the network interface meeting the conditions is found in 4070, the server selects an interface having the minimum reserved bandwidth out of the network interfaces meeting the conditions (4085). Then, the server adds the average bandwidth requested by the client 3101 to the reserved bandwidth (95) of the QOS control table entry of the selected network interface.

The server 3000 uses routing table entries including the address of the selected network interface in the following procedure.

(B) Returning to 4030, when the service class requested by the client 3101 is BE (Best Effort) or unspecified, the server uses the first-found routing table entry.

The server 3000 obtains the network address (71) of a network interface from the selected routing table entry (4200). The server generates a TCB (Transmission Control Block) necessary to perform End-to-End data communication by using the TCP protocol (4210). The server specifies the network address obtained in 4200 as the transmission source address to be written in the TCP, and the network address of the client 3101 as the destination address. After the server generates the TCB, it sends a TCP packet with an ACK flag and a TCP packet with an SYN flag to which the network address of a network interface is added as a parameter to the client 3101, and changes to SYN RECVD state (3502).

In FIG. 11, when the server 3000 receives the TCP packet with an ACK flag in SYN RECVD state from the client 3101

(4250), it registers the network interface address concerned and the network address of the client 3101 into the connection-established communication path control table (the table 3820 of FIG. 13)(4260), and changes to ESTABLISHED state (3503). Hereafter, data communication according to the QOS is performed between the client and the server.

Detailed processing procedure of the client 3101 will be described below referring to FIG. 12. When the client is in the CLOSED state (3550), an application program specifies a network address net1.A (9051) among a plurality of network interfaces of the server 3000 and a QOS (9057), and executes a connect () call (9058). The OS on the client receives a communication path opening request in response to the connect() call (4300). The OS first generates a TCB (Transmission Control Block) necessary for communication with the net1.A and sends a TCP packet with an SYN flag using the QOS value specified by the connect () call as a parameter to the net1.A which is one of the network interfaces of the server 3000 (4310).

After the TCP packet with an SYN flag is sent, the client 3101 is brought to SYN SENT state and waits for a TCP packet with an ACK flag sent from the server 3000 (3551). When receiving the TCP packets with ACK and SYN flags, the client checks if a network address net1.B which is one of the addresses of the network interfaces of the server 3000 agrees with the net1.A (4320). If so, the client sends the TCP packet with an ACK flag to the net1.A of the server 3000 (4345). If not, the client assumes that the server 3000 changes the network interface, deletes the TCB generated in 4310 for communication with the net1.A, and newly generates a TCP for communication with the net1.B (4330).

After generating the TCB, the client sends the TCP packet with an ACK flag to the net1.B of the server 3000 (4340). After returning the ACK, the client registers the network address net1.B of the network interfaces of the server 3000 and the network address net11.10 of the client 3101 into the connection-established communication path control table in the client (4350), and changes to ESTABLISHED state (3552). Hereafter, data communication according to the QOS is performed between the client and the server.

Then, the operation of the LAN switch 3050 in a connection establishing method will be described below referring to FIGS. 7 and 8.

Figure 7:
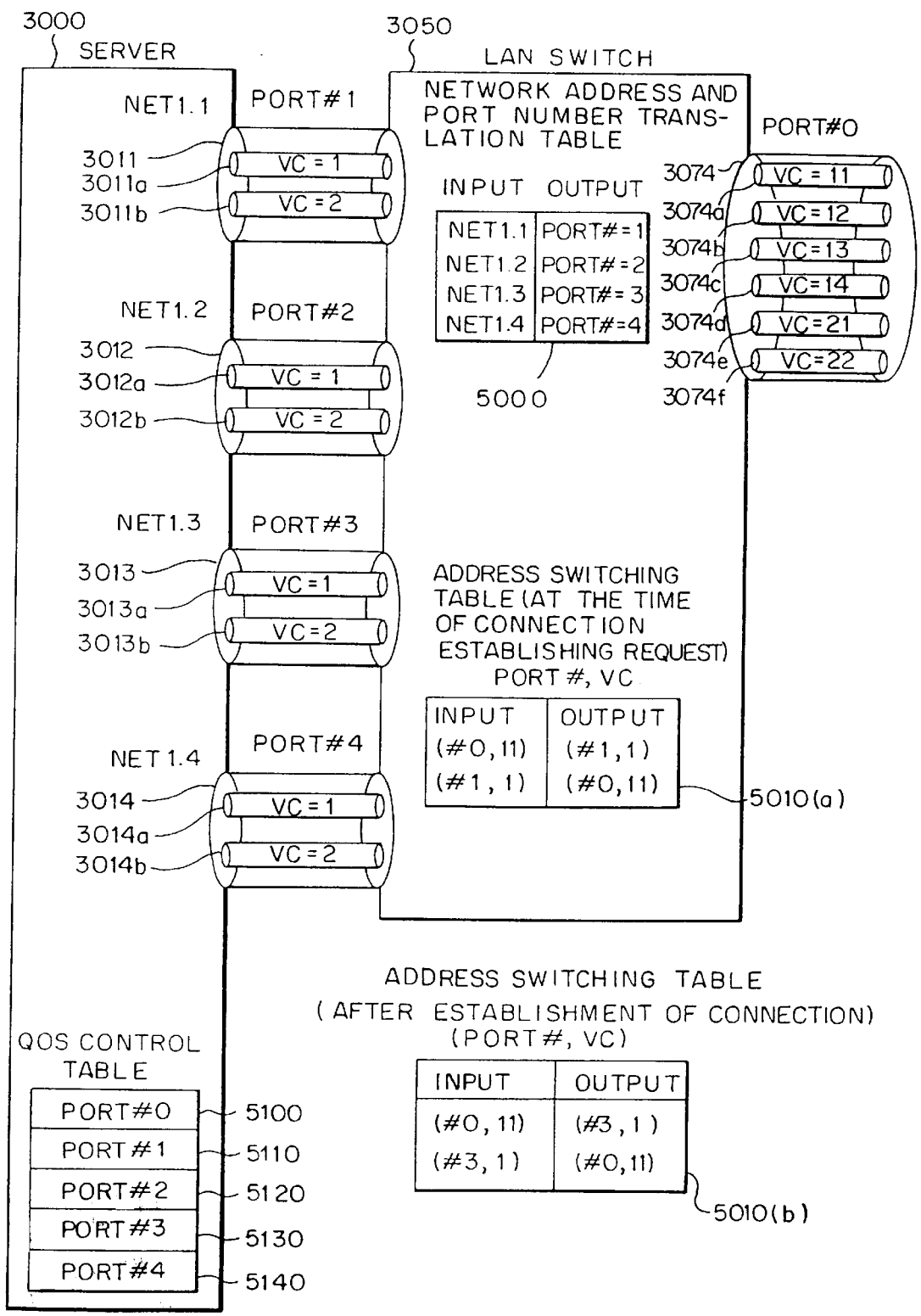
FIG. 7 is a block diagram for explaining an embodiment of LAN switch operation in the connection establishing method of the present invention.
Figure 8:
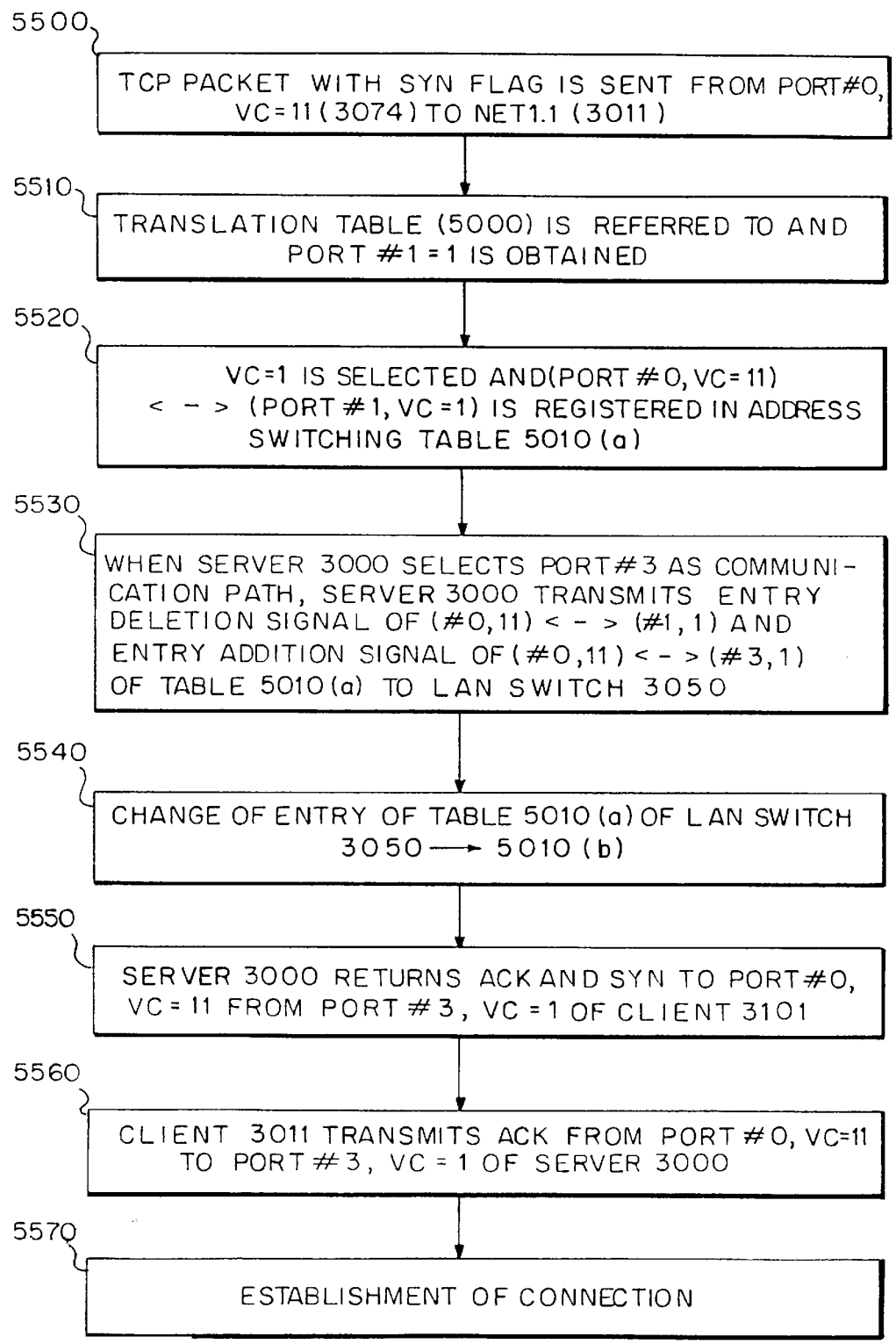
FIG. 8 is a flow chart for explaining an embodiment of the LAN switch operation in the connection establishing method of the present invention.

In FIG. 7, numerals 3011, 3012, 3013, 3014, and 3074 represent communication paths similarly to FIG. 3. Numerals 3011a and 3011b represent virtual channels set up in the communication path 3011. Though FIG. 7 illustrates only two virtual channels because of the limited space of the drawing, more virtual channels are generally present. The virtual channels can dynamically be generated though they are previously set. Numerals 3012a and 3012b represent virtual channels set up in the communication path 3012; 3013a and 3013b represent virtual channels set up in the communication path 3013; 3014a and 3014b represent virtual channels set up in the communication path 3014, and 3074a, 3074b, 3074c, 3074d, 3074e, and 3074f represent virtual channels set up in the communication path 3074. In the communication path 3074, the virtual channels 3074a (VC=11), 3074b (VC=12), 3074c (VC=13), and 3074d (VC=14) are connected to the virtual channels of the communication path 3071, and the virtual channels 3074e (VC=21) and 3074f (VC=22) are connected to the virtual channels of the communication path 3072.

In FIG. 7, numeral 5000 represents a translation table for the network address of each network interface of the server 3000 and the port number of the LAN switch 3050, and 5010(a) represents a switching table showing how a set of each port and virtual channel of the LAN switch 3050 is connected. The translation table 5000 makes it possible to translate a network address into a physical address of the LAN switch 3050 and output a packet to the port specified by the network address. A switching table 5010 is a table prepared when a connection is established.

In FIG. 7, numerals 5100, 5200, 5300, 5400, and 5500 represent the entries of the QOS control tables of ports #0, #1, #2, #3, and #4 of the LAN switch 3050. The format of each entry is the same as those of 90 to 97 in FIG. 1. Because the server 3000 also controls the QOS of the port #0 of the LAN switch 3050, the server 3000 can determine which gateway out of a plurality of gateways connected to the public network 3070 of FIG. 3 must be routed to meet the QOS of the client. That is, in the case of the embodiment described referring to FIGS. 9, 10, and 11, the path at the time of establishing a connection with the client 3101 is determined in accordance with the QOS control table entries 5110, 5120, 5130, and 5140 of the network interfaces 3001, 3002, 3003, and 3004.

Moreover, it is possible for the server 3000 to select a path between the server 3000 and the LAN switch 3050, using the QOS control table entry 5100 of the port #0 of the LAN switch 3050 together, and considering the setting of switching the virtual channel of the port #0 of the LAN switch 3050 and the virtual channel of the ports #1 and #2. The processing procedure for the above determination is the same as the procedure shown in FIGS. 9, 10, and 11.

The operations of the LAN switch 3050 in a connection establishing method will be described below referring to FIG. 8. An example will be described in which a TCP packet with an SYN flag sent to the net1.1 of the server 3000 from the client 3101 is routed to the port #0, VC=11 (3074a) of the LAN switch 3050 (5500). The LAN switch 3050 checks the translation table 5000 to confirm that the destination port # of the TCP packet with an SYN flag sent to the net1.1 is 1 (5510). Then, the switch 3050 selects VC=1 (3011a) out of the virtual channel of the port #1 and registers it into the address switching table 5010(a) so that the (port #0, VC=11) and (port #1, VC=1) are switched to each other (5520). When the server 3000 selects the communication path 3013 (network address net1.3) as a network interface, it deletes an entry describing the relation between the (port #0, VC=11) and (port #1, VC=1) registered in the address switching table 5010 and moreover, adds an entry describing the relation between the (port #0, VC=11) and (port #3, VC=1)(5530). The LAN switch 3050 changes the contents of the address switching table 5010(a)(5540).

As a result of changing the contents, the table 5010(a) is updated as shown in a table 5010(b). Hence, the server 3000 can send a TCP packet with an ACK flag and a TCP packet with an SYN flag to which the network address net1.3 is added as a parameter to the client 3101 (5550). That is, because a packet sent to the (port #3, VC=1) by the server 3000 is switched to the (port #0, VC=1) used when the client 3101 sends the TCP packet with an SYN flag to the server 3000, it is possible not only to send the packet to the client 3101 but also directly use the path established between the client 3010 and the LAN switch 3050, as it is. The client 3101 sends the TCP packet with an ACK flag from (port #0, VC=11) to the (port #3, VC=1) corresponding to the network address net1.3 of the server 3000 (5560) and a connection is established (5570).

As described above, according to the above embodiment 1 of the present invention, the server can select a network interface meeting the condition out of a plurality of network interfaces, and perform data communication in accordance with the QOS requested by a client and the load of the server.

Moreover, according to the above embodiment 1, the client 3101 can establish a connection by using a network interface according to the QOS requested by the client, and perform data communication even if the client does not know the network addresses of all network interfaces of the server 3000 when a connection is established. According to the above embodiment 1, because the switching table in the LAN switch 3050 can be updated in accordance with the instruction from the server 3000, it is possible to perform data communication with a client by using different paths even if only one address of the network interface 3001 is assigned to the network address to be connected to the public network 3070 of the server 3000.

Moreover, in the case of the above embodiment 1, though only one procedure for selecting a network interface is shown, various selection procedures can be considered in accordance of how to use the information in a QOS control table.

(2) Embodiment 2

A method for establishing a parallel connection between the client 3101 and the server 3000, which is embodiment 2 of the present invention, will be described below referring to FIGS. 5, 1, 18, 19, 20, and 21.

Figure 5:
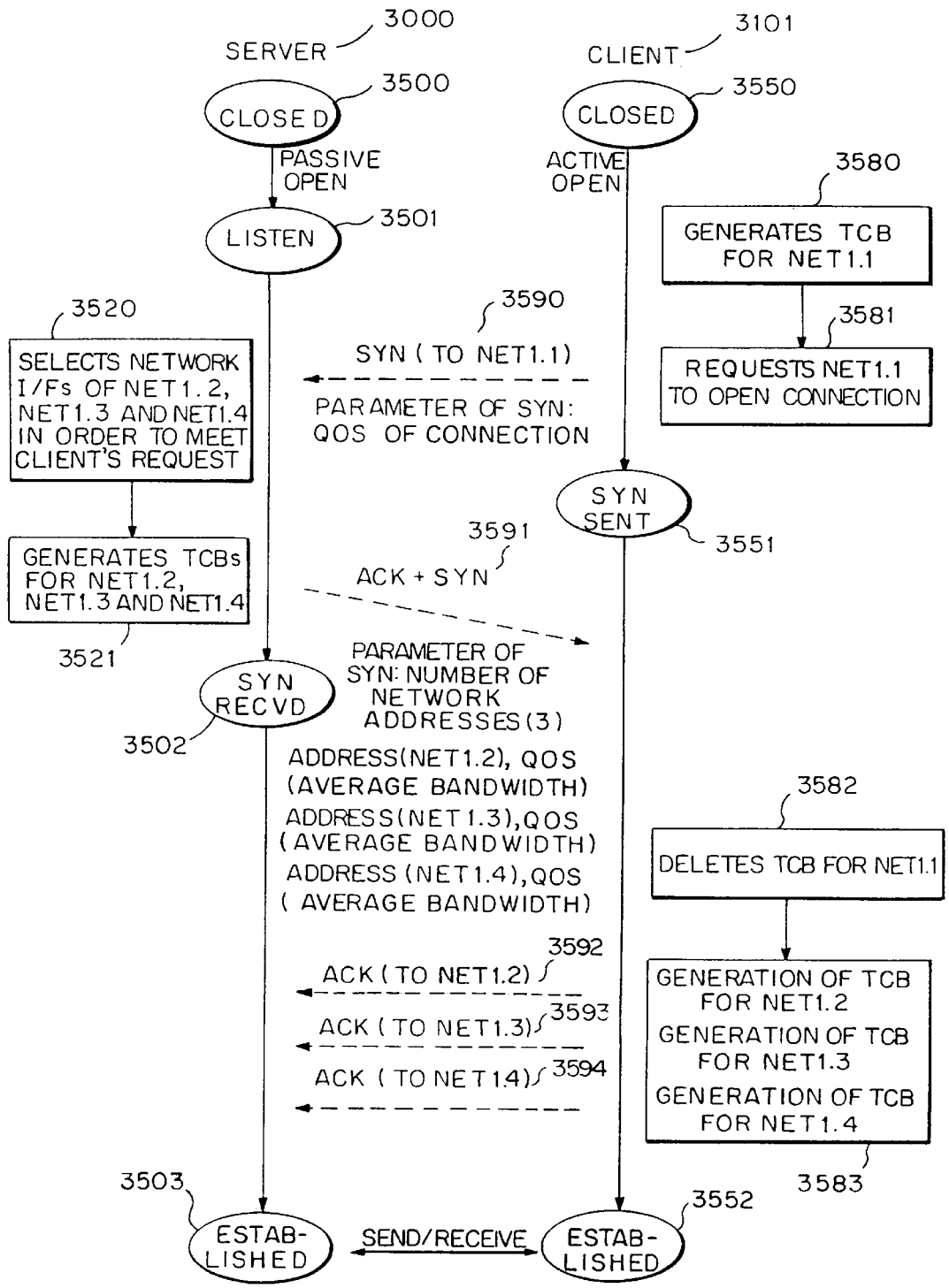
FIG. 5 is an illustration showing an embodiment of the parallel connection establishing method of the present invention.

First, a general processing flow will be described referring to FIG. 5. In FIG. 5, numerals 3500, 3501, 3502, 3503, 3550, 3551, and 3552 represent the states of TCP protocol and 3590, 3591, 3592, 3593, and 3594 represent a three-way handshake for establishing a connection between the client 3101 and the server 3000.

The server 3000 in CLOSED state is brought to LISTEN state when the listen (\*\*) call in the program shown in FIG. 11 is executed (9007) and waits for a connection opening request from a client (3501). The client 3101 in CLOSED state 3550 generates a control block TCB (Transmission Control Block) necessary to control the data communication with the network address net1.1 which is one of the network interfaces of the server 3000 (3580) when the connect (\*\*) call in the program shown in FIG. 16 is executed (9058). Then, to request the net1.1 to open a connection (3581), the client sends a TCP packet in which an SYN flag is set to the server 3000. In this case, the client 3101 transmits the QOS (quality of service) of the connection to the server 3000 as a parameter of the TCP packet with an SYN flag (3590). The QOS, as shown by 9052 in FIG. 16, includes the following three items: service class, peak bandwidth (Mbps), and average bandwidth (Mbps). After sending the TCP packet with an SYN flag, the client 3101 is brought to SYN SENT state (3551).

When receiving a TCP packet with a QOS (quality of service), the server 3000 in LISTEN state seeks a network interface meeting the QOS of the client 3101. When it is impossible to meet the QOS requested by the client 3101 by only one network interface, the server selects a plurality of network interfaces so that the QOS requested by the client 3101 is satisfied by the total value of these network interfaces. An embodiment of a procedure for selecting a plurality of network interfaces will be described later. First, an example will be described below in which three network interfaces 3002, 3003, and 3004 (the network addresses are net1.2, net1.3, and net1.4) in FIG. 3 are selected (3520).

The server 3000 generates three TCBs (Transmission Control Blocks) corresponding to the network addresses net1.2, net1.3, and net1.4 (3521). After generating the three TCBs, the server 3000 sends a TCP packet with an ACK flag for SYN from the client and a TCP packet with an SYN flag to the client 3101 (3591) and brings server to SYN RECVD state (3502). Three network addresses are added to the SYN flag as parameters and moreover, the network addresses net1.2, net1.3, and net1.4 and the QOS (average bandwidth) assigned to each path are added to the SYN flag.

When receiving the TCP packet with an SYN flag to which parameters are attached, the client 3101 deletes the TCB generated for the net1.1 (3582) and generates three TCBs corresponding to the net1.2, net1.3, and net1.4 (3583). Then, the client 3101 sends the TCP packet with an ACK flag to the net1.2, net1.3, and net1.4 respectively (3552, 3593, and 3594) and is brought to ESTABLISHED state (3552). When receiving three ACKs, the server 3000 is also brought to ESTABLISHED state (3503) and three connections are established. Hereafter, it is possible to perform parallel communication between the client and the server in accordance with SEND/RECEIVE (3595).

Figure 17:
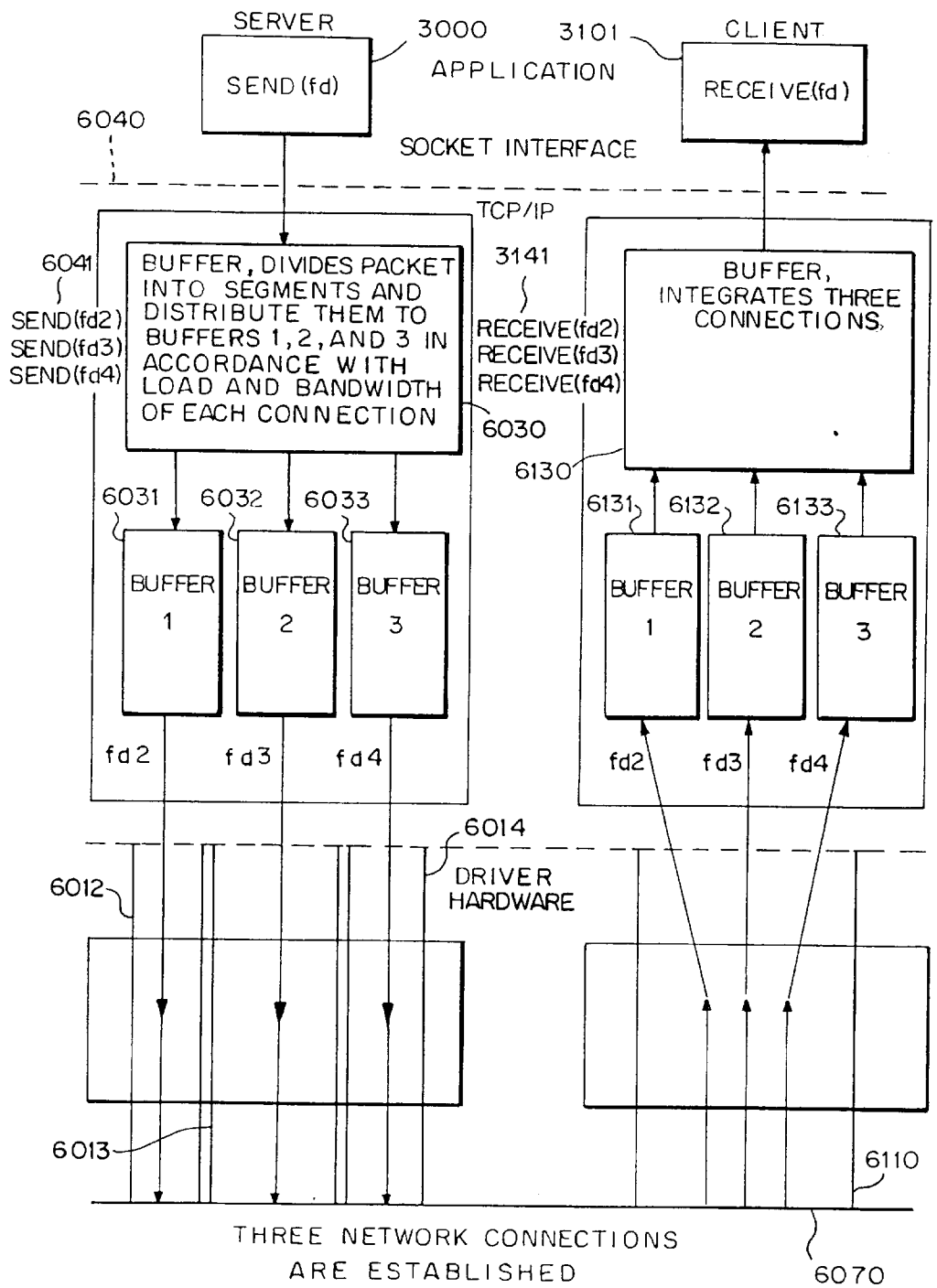
FIG. 17 is an illustration showing an embodiment of a data division and integration method for parallel communication.

An embodiment of a method for division and integration for parallel communication will be described below referring to FIG. 17. In FIG. 17, an example will be described in which data is sent from the server 3000 to the client 3101. Numerals 6030, 6031, 6032, and 6033 represent buffers in the server; 6130, 6131, 6132, and 6133 represent buffers in the client 3101; 6012, 6013, and 6014 represent communication paths (equivalent to the communication paths 3012, 3013, and 3014 in FIG. 3) connected from the server 3000 to a network 6070; and 6110 represents a communication path (corresponding to the communication path 3110 in FIG. 3) connected from the client 3101 to the network 6070. In this case, when sending data from an application, the data is temporarily held in the buffer 6030 in the TCP protocol layer.

The data in the buffer 6030 is divided into three blocks of data for every segment length specified by the application and distributed to the buffers 6031, 6032, and 6033, the number of data being proportional to the bandwidth assigned to each of the three communication paths. When the bandwidth ratio is 2:1:1, data are distributed in order of 6031, 6031, 6032, and 6033 and each buffer temporarily holds data. In the TCP layer, the buffers 6031, 6032, and 6033 of the server 3000 are made to correspond to the buffers 6131, 6132, and 6133 of the client 3101 one to one, and through the mutually-independent connections, data are sent from the server 3000 to the client 3101. That is, the data in the buffers 6031, 6032, and 6033 are sent to the communication path 6110 respectively through the communication paths 6012, 6013, and 6014.

Data sent to the buffers 6131, 6132, and 6133 in the client 3101 are integrated into one block of data and sent to the buffer 6130, and the data is received by the application on the client 3101. As described above, because data is divided and integrated between the TCP layer and the application layer, parallel communication can be concealed from the application program. Therefore, it is possible to meet the QOS requested by a client by realizing parallel communication using the same program as that of single communication.

Moreover, the following algorithm can be used as an algorithm for division and integration. When the data in the buffer 6030 is divided every segment, a serial number is added to each segment. The load states of three communication paths dynamically change. Therefore, to distribute segments to the buffers 6031, 6032, and 6033 from the buffer 6030, a buffer with the minimum number of segments not sent yet is selected out of the buffers 6031, 6032, and 6033. When the numbers of not-sent segments in the buffers are equal to each other, a load can be added to the communication path in which SEND processing is furthest progressed by selecting a buffer with the largest serial number of a head segment. Therefore, the load is dynamically balanced and higher-speed communication is realized.

Figure 18:
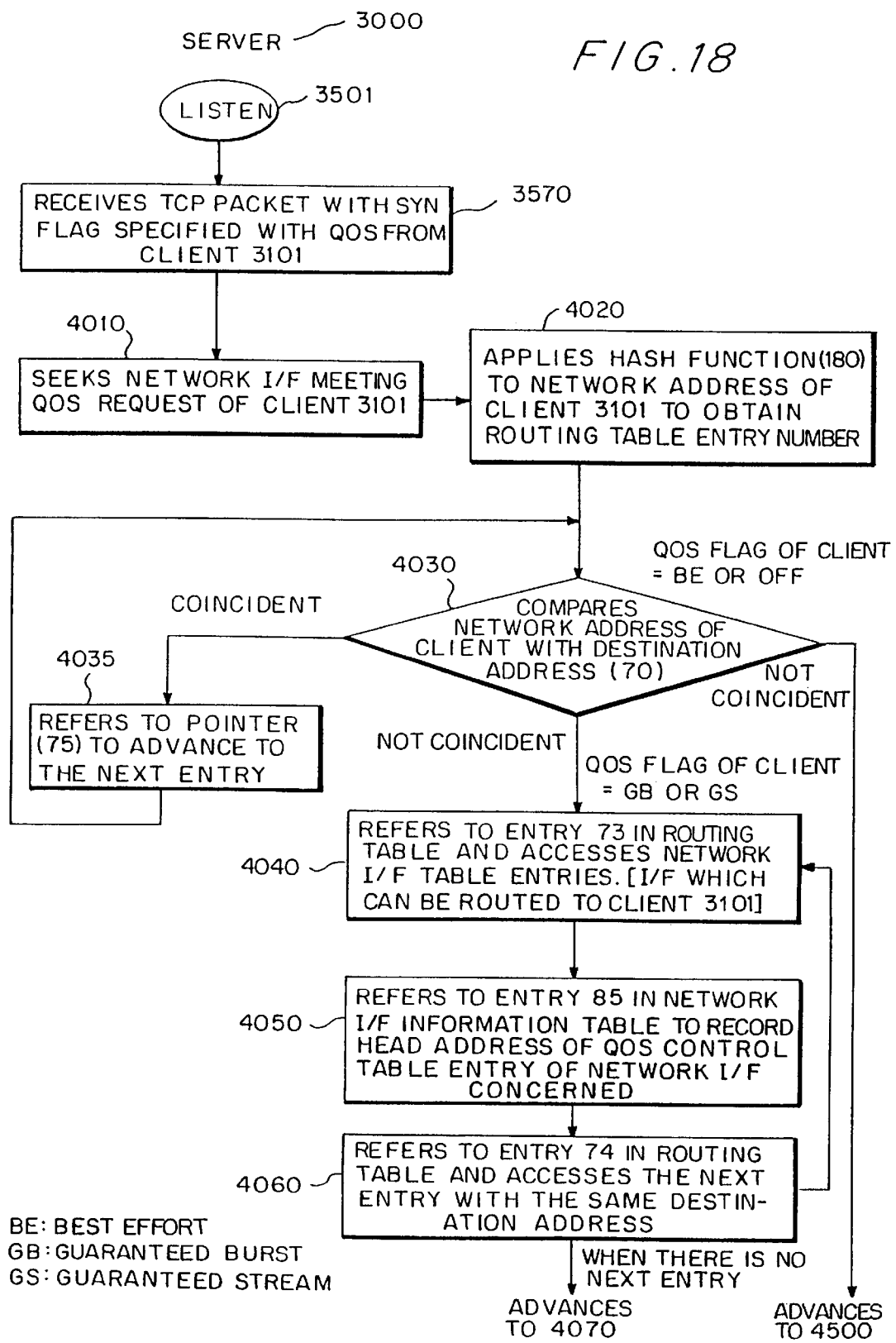
FIG. 18 is a flow chart for explaining an embodiment of the server operation in the parallel connection establishing method of the present invention.
Figure 19:
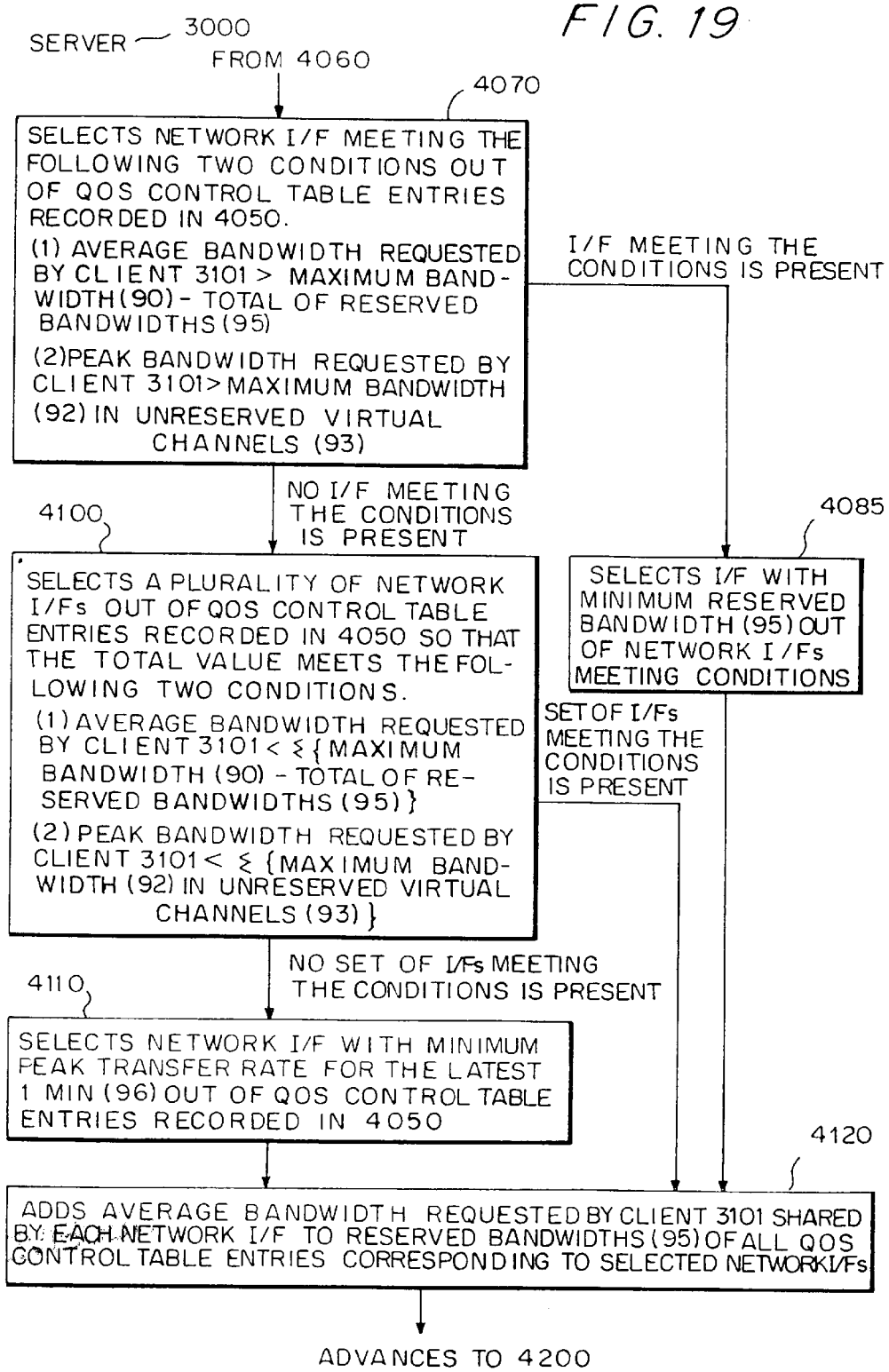
FIG. 19 is a flow chart for explaining an embodiment of the server operation in the parallel connection establishing method of the present invention.
Figure 20:
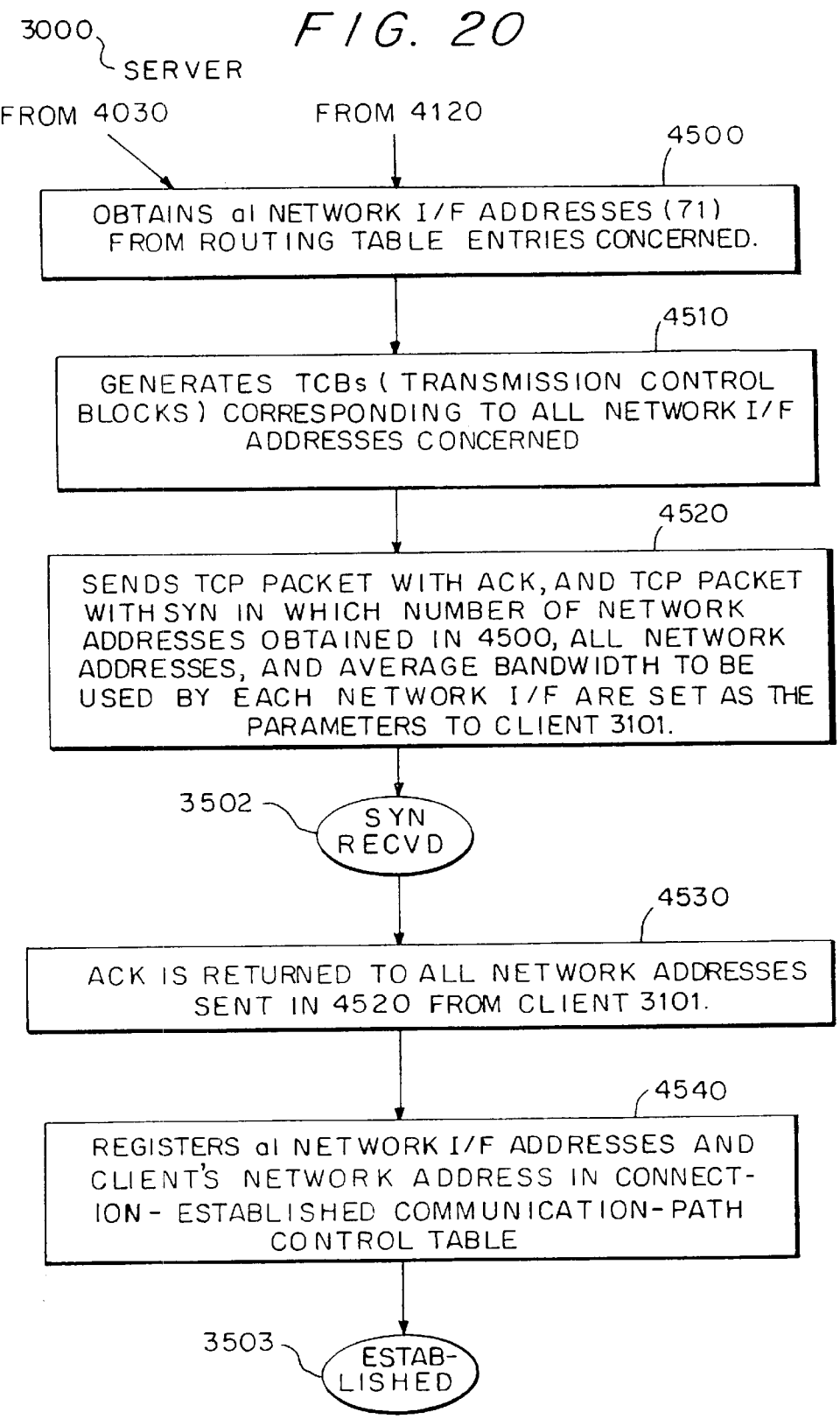
FIG. 20 is a flow chart for explaining an embodiment of the server operation in the parallel connection establishing method of the present invention.
Figure 21:
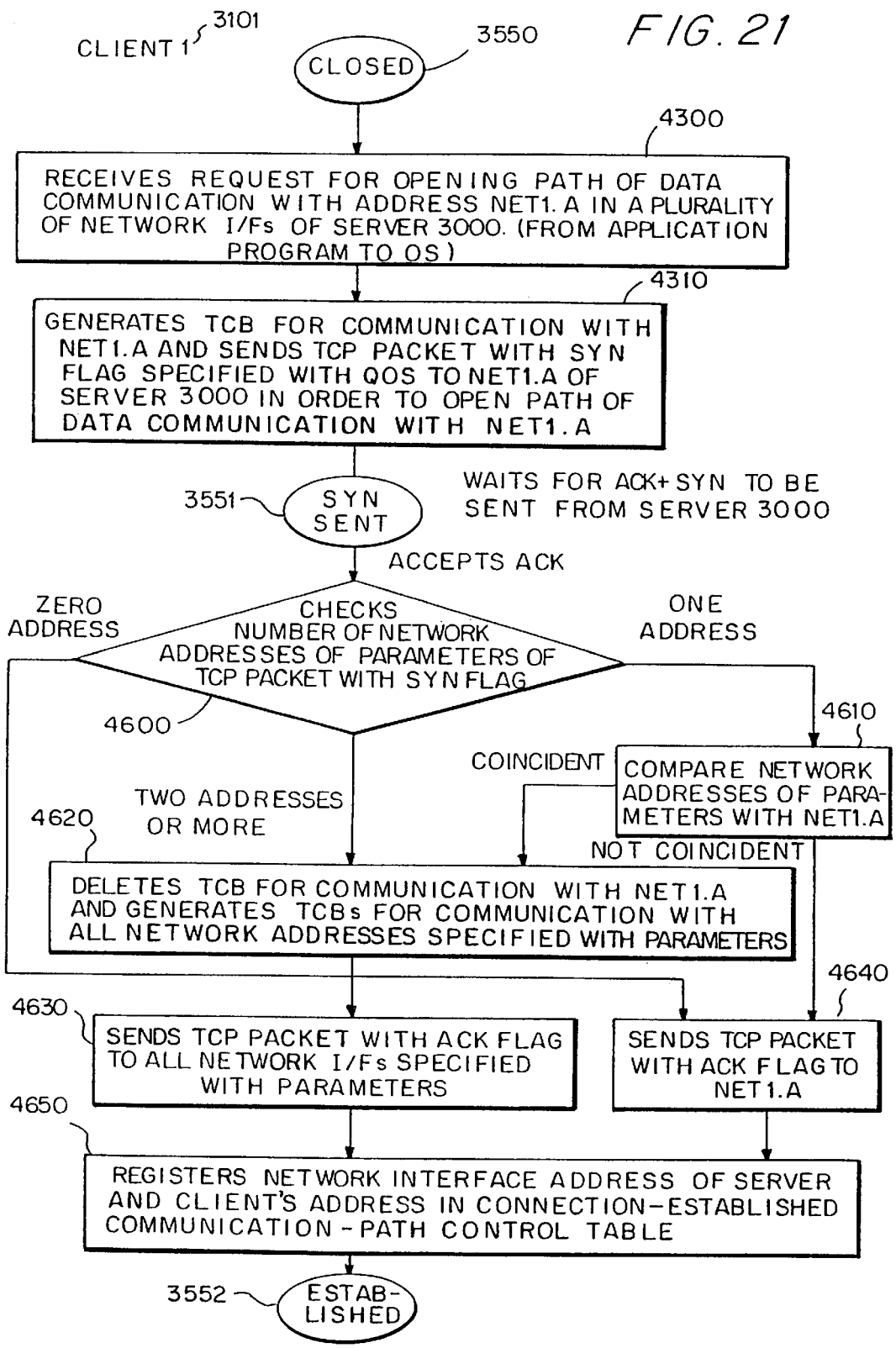
FIG. 21 is a flow chart for explaining an embodiment of the client operation in the parallel connection establishing method of the present invention.

Details of embodiment 2 of the present invention shown referring to FIG. 5 will be described below referring to FIGS. 1, 18, 19, 20, and 21. FIGS. 18, 19, and 20 are flow charts of the processing by the server 3000 in and after the state in which the server waits for a connection establishing request from a client in LISTEN state (3501), and FIG. 21 illustrates a flow chart of the processing by the client 3101. Because the flow chart of FIG. 18 is the same as that of FIG. 9, the description will be omitted.

In FIG. 19, the pointer for the QOS control table entries recorded in 4050 of FIG. 18 is traced, and the record in the QOS control entries are checked to select a network interface of the server 3000 meeting the following two conditions.

(1) The average bandwidth requested by the client 3101 is smaller than the value obtained by subtracting the total of reserved bandwidths (95) from the maximum bandwidth (90).

(2) The peak bandwidth requested by the client 3101 is smaller than the maximum value of the bandwidths of unreserved virtual channels (93)(4070).

Unless there is any network interface meeting the conditions, a plurality of network interfaces are selected so that the total value of interfaces meets the QOS requested by the client 3101. That is, the pointer for the QOS control table entries recorded in 4050 is traced, and the record in the QOS control entries are checked to select a network interface of the server 3000 meeting the following two conditions.

(1) The average bandwidth requested by the client 3101 is smaller than the value obtained by subtracting the total (95) of the reserved bandwidths of the selected network interfaces from the total of the maximum bandwidths (90) of the selected network interfaces.

(2) The peak bandwidth requested by the client 3101 is smaller than the total of the bandwidths of the virtual channels having the maximum bandwidth selected out of the unreserved virtual channels (93) of the selected network interfaces.

When it is impossible to fulfill the request of the client 3101 even by using a plurality of network interfaces, the network interface with the minimum peak transfer rate (96) for the latest 1 min is selected instead of using a plurality of network interfaces (4110). When it is impossible to fulfill the request of the client 3101, though not illustrated in FIG. 19 or 5, it is also possible to hold a conference between the server 3000 and the client 3101, that is, the server 3100 notifies the client 3101 in SYN SENT state that it is impossible to fulfill the request of the client 3101 as a parameter of a TCP packet with an ACK flag and confers with the client 3101 about the QOS, and the client 3101 specifies the QOS again and sends a TCP packet with a SYN flag to the server 3000 again (3590), and the server 3000 seeks a network interface in accordance with the new QOS (3520).

In FIG. 19, when the network interface meeting the conditions is found in 4070, the server selects an interface having the minimum reserved bandwidth out of network interfaces meeting the conditions (4085). Then, the server adds the value of the network interfaces of the average bandwidth which is requested by the client 3101 and which is divided and assigned to each network interface to the reserved bandwidths (95) of the QOS control table entries of all the network interfaces selected in any of 4085, 4100, and 4110 (4120). Routing table entries including the address of the selected network interface are used below.

In FIG. 20, the server obtains the network addresses (71) of all the network interfaces from the selected routing table entries (4500). Then, the server generates TCBs (Transmission Control Block) necessary to perform End-to-End data communication correspondingly to all the selected network interfaces by using the TCP protocol (4510). The server assigns a network address obtained in 4500 to the transmission source address described in each TCB and the network address net11.10 of the client 3101 to a destination address. After generating the TCBs, the sever sends a TCP packet with an ACK flag, the number of selected network interfaces, all the network addresses, and a TCP packet with an SYN flag to which the average bandwidth assigned to each network interface is added as a parameter to the client (4520), and is brought to SYN RECVD state (3502).

The server 3000 sends the TCP package with an ACK flag and the TCP packet with an SYN flag to the client 3101 by using the same network interface through which the server 3000 receives a TCP packet with an SYN flag from the client 3101. When the server receives the TCP packet with an ACK flag in network interfaces corresponding to all the network addresses added to the TCP packet with an SYN flag in 4520 from the client 3101 in SYN RECVD state (4530), it registers all the network interface addresses concerned and the network address of the client 3101 in the connection-established communication-path control table (4540) and is brought to ESTABLISHED state (3503). Hereafter, data communication is performed between the client and the server in accordance with the QOS.

A detailed processing procedure by the client 3101 will be described below referring to FIG. 21. Because a flow chart up to the point where the client is brought to SYN SENT state is the same as that of FIG. 12, a description thereof will be omitted.

The client 3101 in SYN SENT state waits for a TCP packet with an ACK flag sent from the server 3000 (3551). When the client receives the TCP packets with an ACK and SYN flags, it checks the number of selected network interfaces serving as the SYN parameters (4600). When the number of selected network interfaces is 0, the client sends a TCP packet with an ACK flag to the net1.A of the server 3000 (4640). When the number of selected network interfaces is 1, the client checks if the network address specified by the parameter agree with the net1.A (4610). If so, the client sends a TCP packet with an ACK flag to the net1.A of the server 3000 (4640). If the address does not agree with the net1.A or if the number of SYN parameters is 2 or more, the client judges that the server 3000 changes network interfaces, deletes the TCB for communication with the net1.A generated in 4310, and generates a TCB corresponding to each network address so that communication with all the network interfaces newly specified by the SYN parameter (4620) can be performed.

In the case of a network of which the bandwidth is reservable, such as an ATM, the client 3101 selects three virtual channels in accordance with the three QOSs (average bandwidths) notified by the server to establish three connections. Then, the client sends a TCP packet with an ACK flag to each network address specified by the SYN parameter (4630). In the case of a network such as an ATM, the client sends a TCP packet with an ACK flag from each of three virtual channels. After returning the ACK, the client registers all the network addresses of the server 3000 specified by the SYN parameter and the network address net11.10 of the client 3101 in the connection-established communication-path control tables of the client (4650), and is brought to ESTABLISHED state (3552). Hereafter, parallel data communication between the client and the server is performed in accordance with the QOS.

The above communication-path control tables in which connections are established between the server 3100 and the client 3101 are shown in FIGS. 13 and 14 respectively. In FIG. 13, numeral 3820 represents a connection-established communication-path control table, in which it is shown that three connections are established by the entries 3821, 3822, and 3823. Similarly, in FIG. 14, numeral 3910 represents a connection-established communication-path control table, in which it is shown that three connections are established by the entries 3911, 3912, and 3913. Thus, an End-to-End established communication path is controlled.

Figure 22:
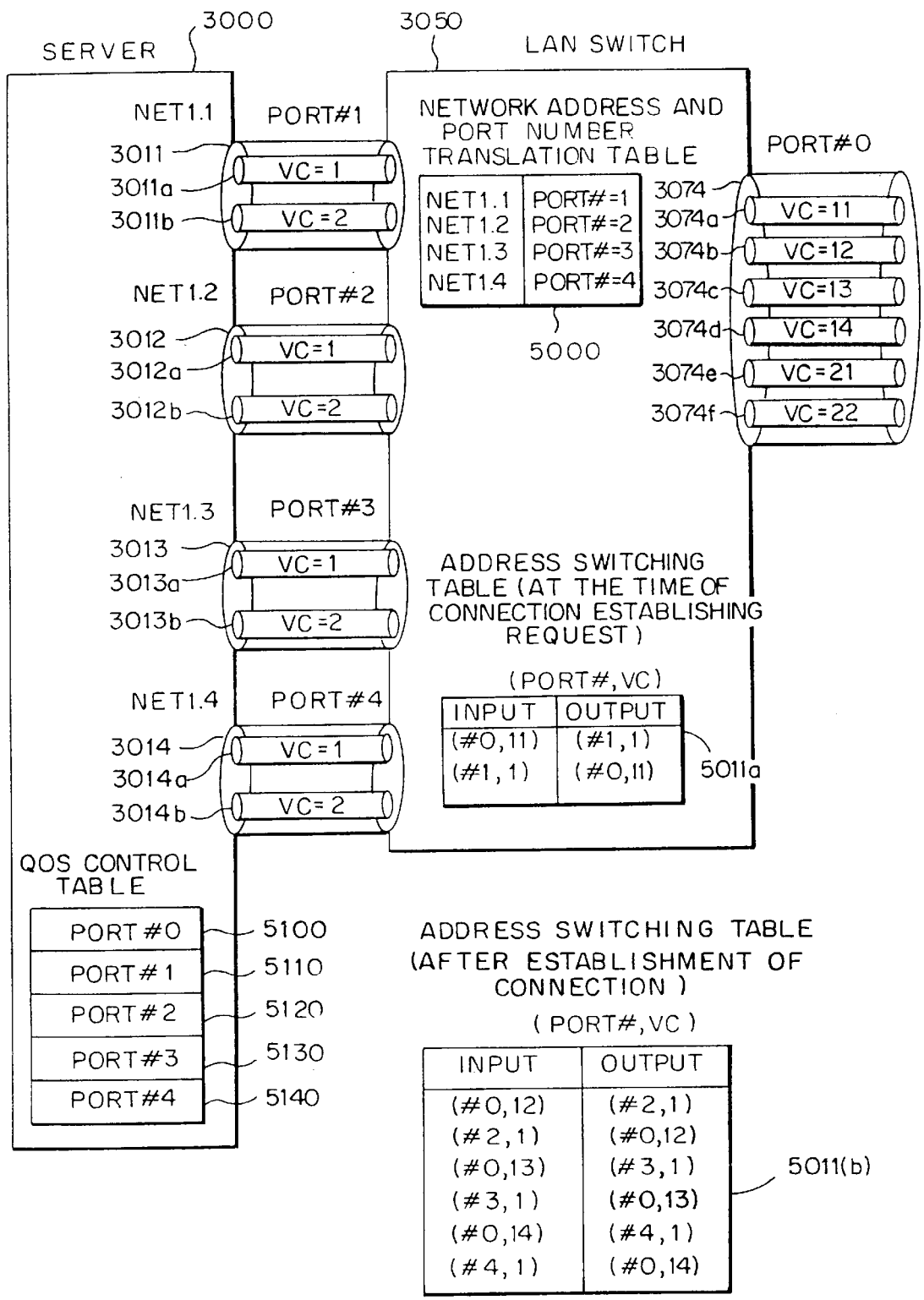
FIG. 22 is a block diagram for explaining an embodiment of the LAN switch operation in the parallel connection establishing method of the present invention.

Then, the operation of the LAN switch 3050 in a parallel-connection establishing method will be described below referring to FIGS. 22 and 23. The description of FIG. 22 will be omitted because it is the same as that of FIG. 7 except the address switching table. In FIG. 22, symbol 5011(*a*) represents an address switching table when the client 3101 sends a TCP packet with an SYN flag to the server 3000, and 5011(*b*) represents an address switching table after the client 3101 sends a TCP packet with an ACK flag to the server 3000 and a connection is established.

The operation of the LAN switch 3050 will be described below, referring to FIG. 23. An example will be described in which a TCP packet with an SYN flag is routed to the port #0, VC=11 (3074*a*) of the LAN switch 3050 and reaches the net1.1 of the server 3000 from the client 3101 (5700). The LAN switch 3050 checks the translation table 5000 to confirm that the transmission destination port of the TCP packet with an SYN flag addressed to the net1.1 is #1 (5710). Then, the switch selects VC=1 out of the virtual channels of the port #1 (3011*a*) and registers it in the address switching table 5011(*a*) so that the (port #0, VC=11) and (port #1, VC=1) are mutually switched (5720). An example will be described below in which the server 3000 retrieves the QOS control table entries 5110, 5120, 5130, and 5140 in accordance with the connection establishing request of the client 3101 and selects three communication paths 3012, 3013, and 3014 (the network addresses are net1.2, net1.3, and net1.4) as the network interfaces. The server 3000 first reserves three virtual channels of the (port #2, VC=1), (port #3, VC=1), and (port #4, VC=1) for the LAN switch 3050 so that three communication paths can be used. Then, the server 3000 returns a TCP packet with an ACK flag and a TCP packet with an SYN flag having a parameter to the client 3101 from the (port #1, VC=1) of the LAN switch 3050 through the (port #0, VC=11). The server adds the network addresses of the selected network interfaces and the average bandwidth used by each network interface to the SYN flag as the QOS (5740). Thereafter, the server requests the LAN switch 3050 to delete the entry for specifying the switching of the (port #1, VC=1) and (port #0, VC=11) and releases the path so that others can use it (5750).

When the client 3101 receives the TCP packet with an SYN flag and detects the network addresses of the selected network interfaces and the average bandwidth used by each network interface, it returns the ACK to each network interface. In the process of returning the ACK, the client newly ensures a virtual channel from the client 3101 to the LAN switch 3050 so as to meet the condition of the average bandwidth. In this case, assume that the routes to the LAN switch 3050 through three paths of the (port #0, VC=120), (port #0, VC=13), and (port #0, VC=14) (5760) are established. The LAN switch 3050 obtains the port numbers #2, #3, and #4 for reaching network interfaces from the three destinations net1.2, net1.3, and net1.4 of the TCP packet with an ACK flag and the port number translation table 5000. The LAN switch 3050 registers the entries of the address switching table so as to switch the (port #2, VC=1), (port #3, VC=1), and (port #4, VC=1) reserved in 5730 and the (port #0, VC=12), (port #0, VC=13), and (port #0, VC=14) respectively (5770). As a result, the address switching table is updated as shown in 5011(*b*)(5780), three connections are established (5790), and data communication is performed in accordance with parallel SEND/RECEIVE.

As described above, according to embodiment 2 of the present invention, the server can select a plurality of network interfaces meeting the condition out of a plurality of network interfaces in accordance with the QOS requested by a client and the load of the server, and perform data communication.

Moreover, according to the embodiment 2, the client 3101 can establish a connection and perform data communication by using a network interface corresponding to the QOS requested by the client without knowing the network addresses of all the network interfaces of the server 3000 when the connection is established.

Though only one procedure for selecting a network interface has been shown in the case of the above embodiment 2, it is possible to consider various selection procedures depending on how to use the QOS control table.

(3) Embodiment 3

In the case of the above embodiment 2, network addresses are individually assigned to the network interfaces 3001, 3002, 3003, and 3004 of the server 3000. However, the embodiment shown in FIGS. 6 and 24 can perform parallel communication by only assigning a single network address to the server 3000 and using the network interfaces 3001, 3002, 3003, and 3004.

In FIG. 24, numeral 3000 represents a server; 3050 represents a LAN switch; and 3011, 3012, 3013, 3014, and 3074 represent communication paths of ports #1, #2, #3, #4, and #0 respectively and correspond to the elements represented by the same numbers in FIG. 3. Numeral 7000 represents a parallel communication flag detection circuit, 7010 represents a packet switching circuit, 7100 represents a packet header, 7110 represents a transmission-source network address, 7120 represents a destination network address, 7130 represents a parallel communication flag, and 7135 represents the port number of the server 3000. The parallel communication flag 7130 and the port number 7135 are items added to the packet option field. The network address net1.1 is assigned only to the port #1 among the ports #1 to #4.

Figure 6:
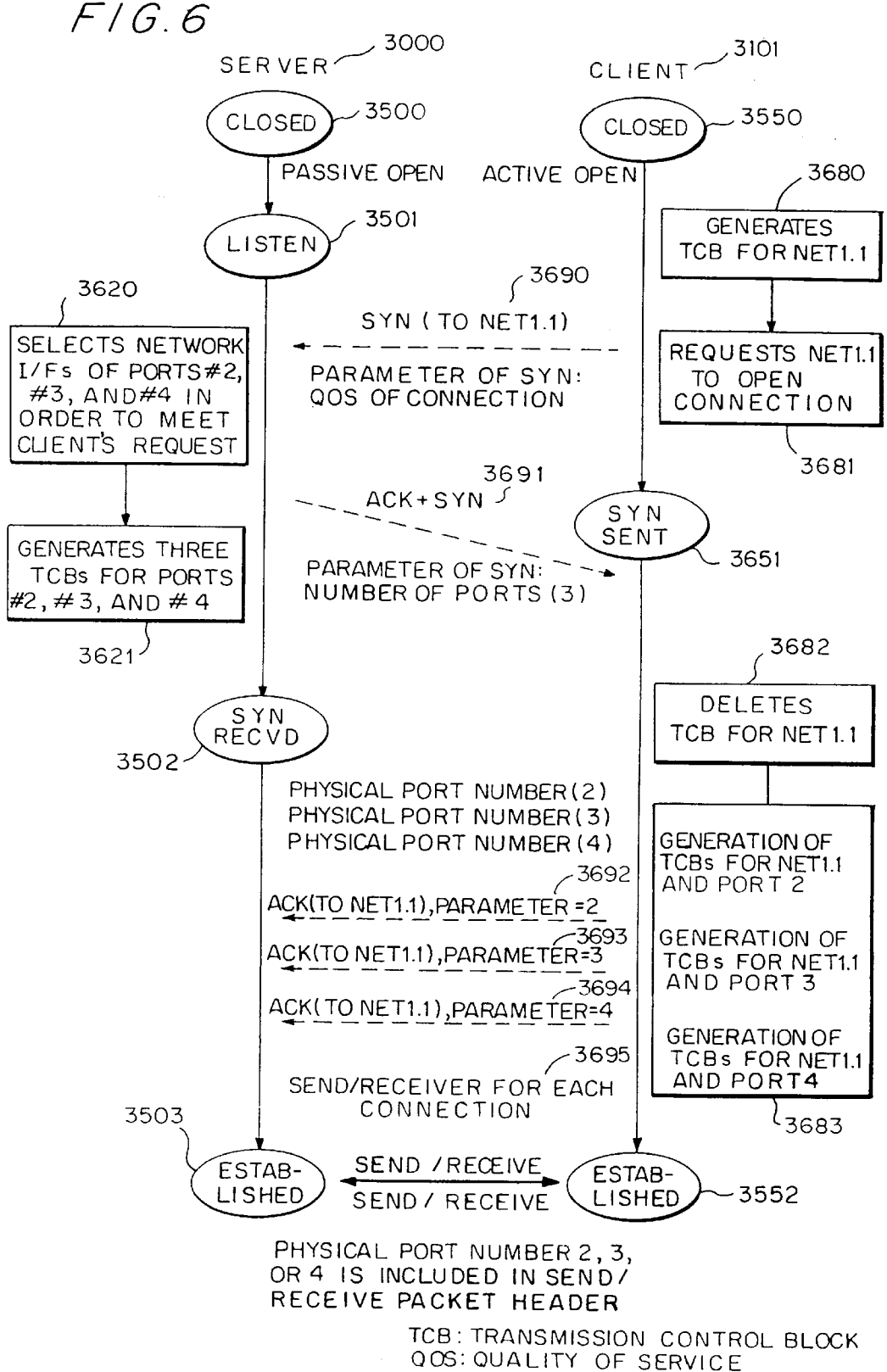
FIG. 6 is an illustration showing an embodiment of the second parallel connection establishing method of the present invention.

In FIG. 6, numerals 3500, 3501, 3502, 3503, 3550, 3551, and 3552 represent a TCP protocol state and 3690, 3691, 3692, 3693, and 3694 represent a three-way handshake for establishing a connection between the client 3101 and the server 3000. The flow of the processing by a method for establishing a second parallel connection will be described referring to FIG. 6. The flows until the server is brought to LISTEN state (3501) and the client is brought to SYN SENT state (3561) are the same as those in FIG. 5. Therefore, the description of them will be omitted.

When the server 3000 in LISTEN state (3501) receives a TCP packet with a QOS (quality of service) from the client 3101 (3690), it seeks a network interface meeting the QOS of the client 3101. When it is impossible to meet the QOS requested by the client 3101, the server selects a plurality of network interfaces so that the total of the network interfaces can meet the QOS requested by the client 3101. An example will be described below in which three network interfaces 3002, 3003, and 3004 (port numbers 2, 3, and 4) in FIG. 3 are selected (3620). The server 3000 generates three TCBs (Transmission Control Blocks) corresponding to the port numbers 2, 3, and 4 (3621). After generating the three TCBs, the server 3000 sends a TCP packet with an ACK flag and a TCP packet with an SYN flag corresponding to the SYN sent from the client to the client 3101 (3691) and brings the TCBs to SYN RECVD state (3502). The server adds three port numbers (2, 3, and 4) to the SYN flag as parameters. When the client 3101 receives the TCP packet with an SYN flag to which the parameters are added, it deletes the TCB generated for the net1.1 (3682) and generates three TCBs corresponding to the net1.1 and port number 2, net1.1 and port number 3, and net1.1 and port number 4 (3683). Then, the client 3101 sends a TCP packet with an ACK flag to the net1.1 and port number 2, net1.1 and port number 3, and net1.1 and port number 4 respectively (3692, 3693, and 3694), and is brought to ESTABLISHED state (3552). When the server 3000 receives three ACks, it is also brought to ESTABLISHED state (3503) and three connections are established. Hereafter, it is possible to perform parallel communication between the client and the server in accordance with SEND/RECEIVE by using the three connections (3695).

FIG. 24 shows a header format of a packet capable of expressing the "net1.1 and port number 2". In FIG. 24, to perform communication by using a plurality of ports in parallel, the parallel communication flag 7130 in the option field of the packet header is set to "1", and "21" is also set as the port number 7135 in the option field. When the parallel communication flag detection circuit in the LAN switch 3050 detects that the parallel communication flag in the packet header is set to 1, it sends the packet to the packet switching circuit 7010, detects the port number in the packet header, and sends the packet to the server 3000 by using the network interface having the specified port number. As described above, it is possible to perform parallel communication in the case of a packet to be sent to the server 3000 from the client 3101 by using the network interfaces 3001, 3002, 3003, and 3004.

In the case of a packet to be sent to the client 3101 from the server 3000, it is possible to perform parallel communication by setting the network address of the network interface in the routing table entries shown in FIG. 1 as the port number and thereby only assigning a single network address to the server 3000, and using the network interfaces 3001, 3002, 3003, and 3004.

As described above, it is possible to perform parallel communication between the client 3101 and the server 3000 by extending the header format of a packet and thereby only assigning a single network address to the server 3000, and using the network interfaces 3001, 3002, 3003, and 3004.

In the case of the above embodiments (1) to (3), a method for establishing a connection between a client and the server in the TCP/IP protocol layer has been described and moreover, the server can select a network interface meeting the QOS request of the client by adding the column (71) of the network address of the network interface to the routing table.

Figure 25:
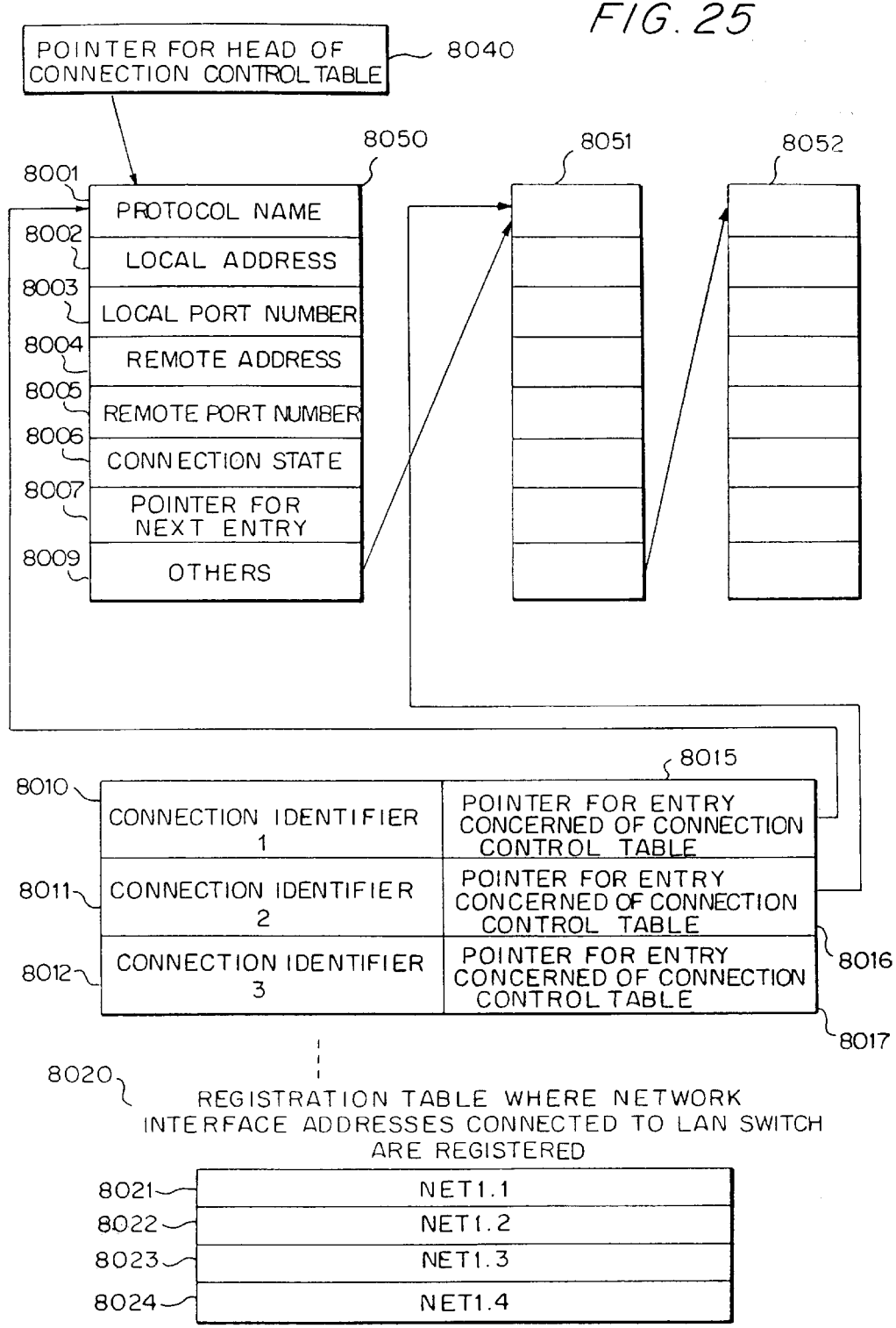
FIG. 25 is an illustration for explaining the server routing method in the parallel connection establishing method of the present invention.
Figure 26:
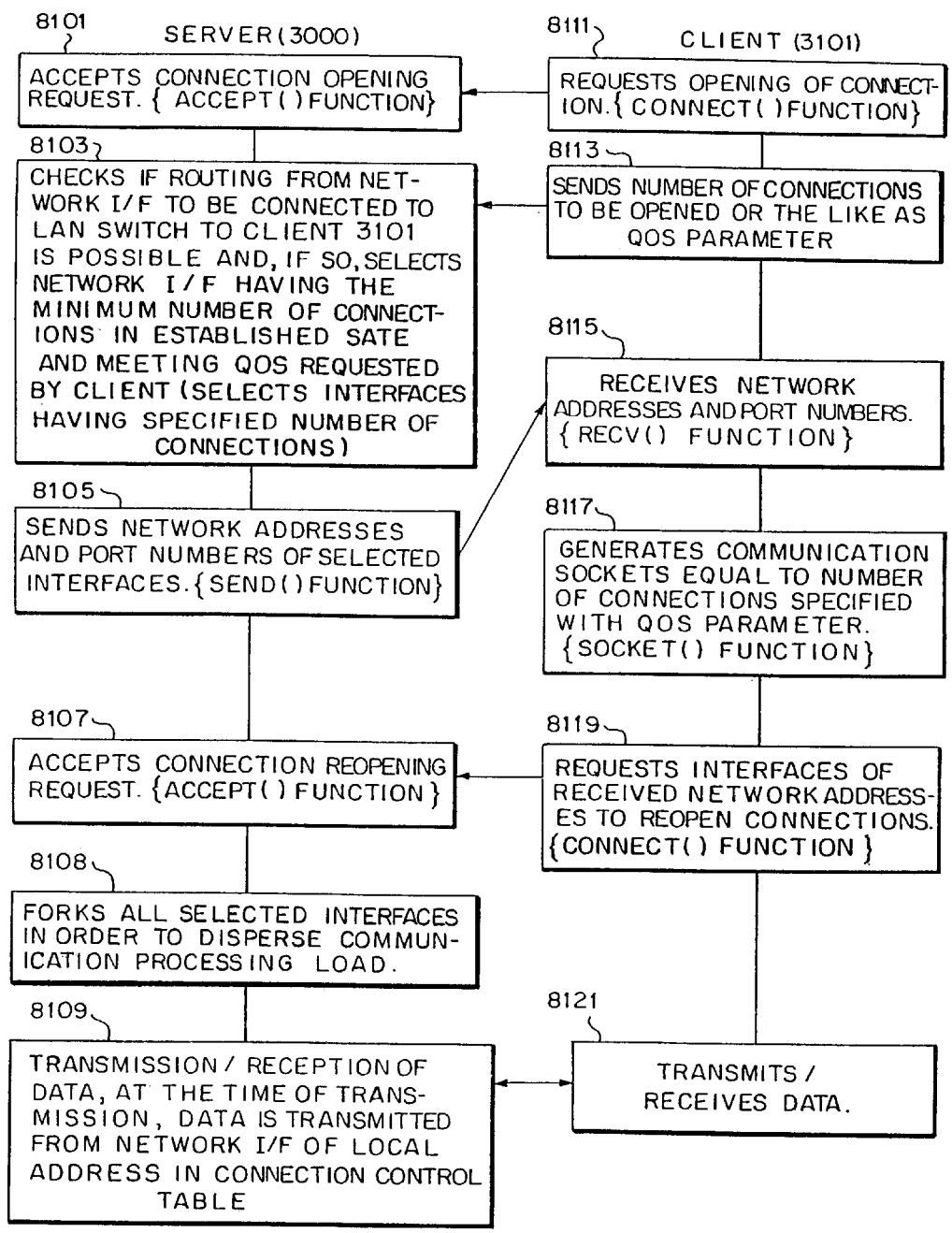
FIG. 26 is an illustration showing an embodiment of the fourth parallel connection establishing method of the present invention.

However, the embodiment shown in FIGS. 25 and 26 makes it possible to select a network interface not only so as to meet the QOS request of the client but also so that the server balances the load of communication processing between its own network interfaces by using the connection control table shown in FIG. 25. Moreover, though the gateway address which is the next packet transmission destination is obtained by using a routing table as conventional, it is possible to select a network interface through which a client requests the server establish a connection by using the connection control table and the registration table where the addresses of the network interface connected to the LAN switch both shown in FIG. 25. As a result, it is possible to perform two-way communications using a network interface through which a client requests the server to establish a connection.

FIG. 25 illustrates the connection control table on the server 3000 in FIG. 3. In FIG. 25, numeral 8050, 8051, and 8052 represent the entries of the connection control table respectively to hold the information about connections opened between the server 3000 and a client. In the connection control table entry 8050, numeral 8001 represents the protocol name used for communication, 8002 represents the network address of a network interface of the server through which the client requests the server to establish a connection, 8003 represents the port number for the server to identify the connection, 8004 represents the network address of the client, 8005 represents the port number of the client side, 8006 represents the connection state such as CLOSED, LISTEN, or ESTABLISHED shown in FIG. 4, and 8007 represents the pointer for the next connection control table entry. The entry of the connection control table is generated when a connection is established. Symbol 8040 represents the pointer for the head of the entries of the connection control table.

There are pointers 8015 to 8017 for the entries concerned of the connection control table correspondingly to connection identifiers (file descriptors) 8010 to 8012. The pointers 8015 to 8017 point the entries 8050 to 8052 of each connection control table.

Numeral 8020 represents a register table for registering the network interface addresses connected to the LAN switch. The network interfaces 3001 to 3004 of the network interface addresses registered in entries 8021 to 8024 are all connected to the LAN switch 3050 as shown in FIG. 3. Thereby, even if a packet is sent from any one of the network interfaces 8021 to 8024, the packet can be routed to the same network. Therefore, by selecting a network interface so as to balance the loads of the network interfaces 3001 to 3004, it is possible to obtain a high throughput. Detailed embodiments will be described below.

The flow chart in FIG. 26 illustrates an embodiment of the parallel networking method of the present invention for realizing the communication between the client 3101 and the server 3000 at a high order of the TCP/IP protocol layer. The client 3101 sends a connection opening request to the server 3000 (8111). The server 3000 waits for the connection opening request and accepts the connection opening request from the client 3101 (8101). The client 3101 sends the QOS parameters to the server 3000 (8113). In this case, when using a plurality of network interfaces as the QOS parameters, the number of network interfaces, peak bandwidth for the connection, and average bandwidth are specified.

Figure 2:
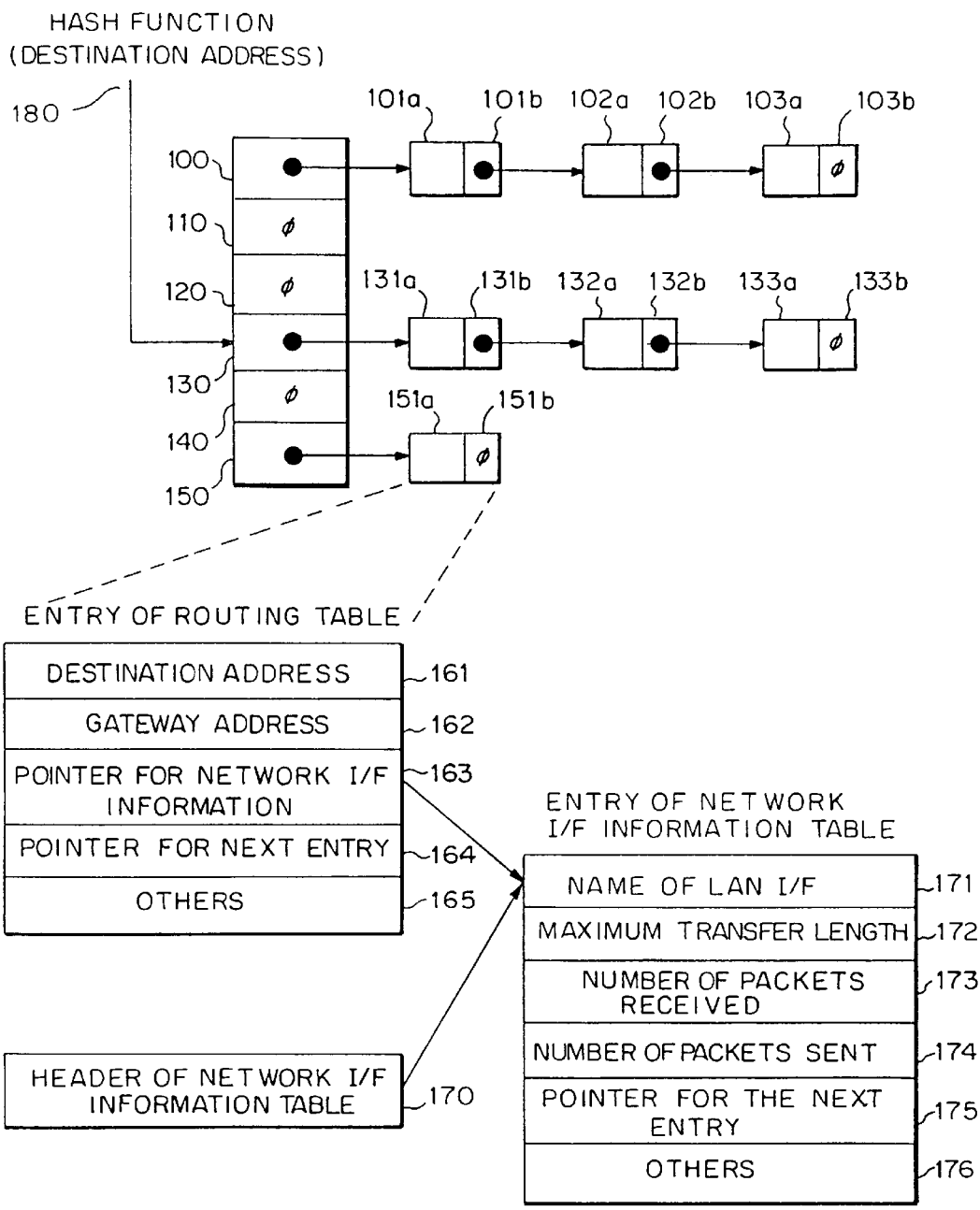
FIG. 2 is an illustration showing a conventional routing table and its entries and entries of a network interface information table.

When the server 3000 receives the QOS parameters from the client 3101, it checks if routing from the LAN switch shown in FIG. 3 to the client 3101 is possible. If so, the server traces the entries of the connection control table shown in FIG. 25 to select a network interface with the minimum number of connections in ESTABLISHED state (8103). It is judged that routing from the LAN switch 3050 to the client 3101 is possible when the conventional routing tables 100 to 150 shown in FIG. 2 are searched by using the network address of the client 3101 as a key and the obtained gateway address is connected with the network address of the LAN switch 3050.

A network interface selecting procedure when routing from the LAN switch 3050 to the client 3101 is possible will be described below in detail referring to FIG. 25. The connection control table entry 8050 is accessed from the pointer 8040 for the head of the entries of the connection control table. The number of connections in which the connection state 8006 is ESTABLISHED is counted every network interface with the same local address 8002. The local address 8002 is the same as that of one of the network interface addresses of the server 3000. Therefore, a network interface with the minimum number of entries is obtained out of the network interfaces registered in the table 8020 where the network interface addresses connected to the LAN switch are registered.

Moreover, similarly to embodiment (1), it is possible to select a network interface with the minimum load in accordance with the statistical information 90 to 97 described in the QOS control table entries indicated by the pointers for the QOS control table entries by tracing each entry, using the pointer 84 for the next entry in the network interface information table shown in FIG. 1. For example, it is also possible to select a network interface with the minimum number of virtual channels 94 or a network interface with the minimum average transfer rate 97 for the latest 1 min.

Moreover, when the number of network interfaces greater than 1 is set as a QOS parameter, a specified number of entries is successively selected starting with the entry with the minimum number of connections.

Referring back to the flow chart of FIG. 26, the server 3000 sends the network address of a selected network interface and the port number for communication to the client 3101 (8105). When the client 3101 receives the network address and the port number (8115), it generates a socket for communication (8117) to send a connection opening request to the received network interface of the server 3000 (8119) that the client has received. When the client reopens the network interface and connection specified by the server 3000, it is possible to balance the load of each network interface of the server.

When the server 3000 receives the connection opening request from the client 3101 (8107), it forks a child process in order to balance the load of communication processing. Particularly when a network interface is present in each node like a parallel processor, the server forks a child process to each node corresponding to the selected network interface (8108). Then, data is transferred between the client and the server (8109 and 8121).

When the server sends data to the client, it obtains the connection control table entry 8050 from the pointer 8015 for the connection control table entry by using the server connection identifier 8010 corresponding to the connection concerned and sends a packet from the network interface shown by the local address 8002 in the entry (8109). As a result, it is possible to perform two-way communication using a network interface through which the client requests the server to establish a connection.

As described above, by adding the table for registering network interface addresses connected to a LAN switch and moreover, using the local address of a connection control table, it is possible to perform two-way communication using a network interface through which a client requests a server to establish a connection without changing conventional routing tables. Moreover, it is possible to judge the load of each network interface by counting the number of entries of the connection control table and balance the load of communication processing when the server mainly selects a network interface used for communication with the client. Thus, it is possible to improve the throughput of a networking processing system.

As described above, the present invention uses a server provided with a plurality of network interfaces and thereby makes it possible to perform communication by using network interfaces according to the QOS requested by the client or high-speed high-efficiency parallel communication by using a plurality of network interfaces.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A networking system for performing data communication to a client computer from a server computer having a plurality of network interfaces through a network, comprising:

a LAN switch, provided between the network and the server computer, and having a plurality of communication paths correspondingly connected to the network interfaces of the server computer, thus rendering any one of said communication paths usable to connect the client computer with the server computer; and selection means for selecting one of said communication paths in accordance with a quality of service (QOS) requested by the client computer;

wherein the selection means selects said communication path using information contained in a routing table in the server computer based on a network address of the network connected to the client computer, said routing table having the address of the network connected to the client computer and addresses of network interfaces of the server computer correspondingly connected to said communication path.

2. The networking system according to claim 1, wherein said LAN switch comprises:

an ATM switch.

3. The networking system according to claim 1, further comprising a QOS control table holding statistical information about virtual-channel bandwidth and dynamic load for each of the network interfaces, the QOS control table being referred to when establishment of a communication path is requested.

4. The networking system according to claim 1, wherein the quality of service (QOS) is composed of three items including a service class, a peak bandwidth, and an average bandwidth, wherein said service class includes at least three kinds of service including Best Effort (BE) which is normal data communication, Guaranteed Burst (GB) which is data communication for burst transfer, and Guaranteed Stream (GS) which is communication of stream data including video data and audio data.

5. The networking system according to claim 4, wherein the quality of service (QOS) is composed of three items including a service class, a peak bandwidth, and an average bandwidth, wherein said service class includes at least three kinds of service including Best Effort (BE) which is normal data communication, Guaranteed Burst (GB) which is data communication for burst transfer, and Guaranteed Stream (GS) which is communication of stream data including video data and audio data.

6. A computer for performing network communication with another computer comprising:

a plurality of network interfaces;

a routing table for storing a plurality of entries each including a final destination network address of a packet, an address of a network interface, and a network address of a gateway to which the packet is to be sent; and means for selecting at least one network interface and transmitting said packet to a gateway from the selected network interface based on information contained in said entries of said routing table.

7. A computer according to claim 6, further comprising:

quality-of-service (QOS) holding means for holding information concerning the state to be used for each of the network interfaces, selecting at least one entry where the final destination network address agrees with a network address of another computer out of the entries in the routing table when selecting the network interface, comparing a requested service to the information held in the QOS holding means and selecting at least one network interface out of the routing table based on the comparison.

8. A computer according to claim 7, wherein, when said another computer requests said computer to open a communication path, said computer selects at least one entry where the final destination network address agrees with the network address of said another computer out of the entries of the routing table in accordance with QOS parameters including service class, average traffic, and peak traffic of the communication path specified by said another computer, compares information held in said QOS holding means of the network interface specified by the network interface address of the selected entry of the routing table with the QOS parameters, and selects at least one network interface so that the specified QOS parameters can be satisfied.

9. A computer according to claim 7, wherein said computer transmits the address of at least one of the network interfaces selected by said computer to said another computer together with a synchronization (SYN) packet when a communication path is opened between said computer and said another computer.

10. A computer according to claim 7, wherein said computer is provided with a LAN switch having a plurality of first communication paths connected to the network interfaces for sending packets from said computer to a public network by bundling the first communication paths and a second communication path, said LAN switch being provided with switching holding means for specifying switching between the first communication paths and the second communication path, and said computer directs the LAN switch so that the switching holding means specifies a first communication path selected by said computer.

11. A parallel networking method in a networking system having a first computer which includes a plurality of network interfaces and a second computer connected to a network computer, said first computer further includes a routing table for storing a plurality of entries each including a final destination network address of a packet, an address of a network interface, and a network address of the gateway computer to which said packet is to be sent, said parallel networking method comprising the steps of:

selecting, by said first computer, at least one network interface in response to a communication request; and sending a packet to a gateway from the selected network interface based on information contained in the entries of the routing table.

12. A parallel networking method according to claim 11, further comprising the steps of:

when the second computer requests the first computer to open a communication path, selecting by said first computer at least one entry where the final destination network address agrees with the network address of said second computer out of the entries of the routing table;

comparing QOS holding means of the network interface specified by the network interface address of the entry selected out of the routing table with QOS parameters specified by said second computer;

selecting at least one network interface so that the QOS parameters specified by said second computer can be satisfied; and sending said packet to said gateway of said first computer through the selected network interface.

13. A parallel networking method according to claim 11, further comprising the step of:

notifying, by said first computer, said second computer of the network addresses of all selected network interfaces together with a synchronization (SYN) packet to be transmitted when a communication path is opened.

14. A parallel networking method according to claim 11, wherein when said second computer includes a network interface having a large bandwidth, data communication is performed by using the network interfaces of said first computer in parallel.

15. A method of performing data communication to a client computer from a server computer having a plurality of network interfaces through a network, wherein a LAN switch is provided between the network and the server computer, said LAN switch having a plurality of communication paths correspondingly connected to the network interfaces of the server computer, wherein any one of said communication paths are usable to connect the client computer with the server computer, said method comprising the steps of:

selecting one of said communication paths in accordance with a quality of service (QOS) requested by the client computer; and selecting said communication path using information contained in a routing table in the server computer based on a network address of the network connected to the client computer, said routing table having the address of the network connected to the client computer and addresses of network interfaces of the server computer correspondingly connected to said communication path.

16. A method according to claim 15, wherein a QOS control table holding statistical information about virtual-channel bandwidth and dynamic load is provided in the server computer for each of the network interfaces, wherein said method further comprises the step of:

referring to the QOS control table when establishment of a communication path is requested.

17. A method according to claim 15, wherein the quality of service (QOS) is composed of three items including a service class, a peak bandwidth, and an average bandwidth, wherein said service class includes at least three kinds of service including Best Effort (BE) which is normal data communication, Guaranteed Burst (GB) which is data communication for burst transfer, and Guaranteed Stream (GS) which is communication of stream data including video data and audio data.

18. A method according to claim 16, wherein the quality of service (QOS) is composed of three items including a service class, a peak bandwidth, and an average bandwidth, wherein said service class includes at least three kinds of service including Best Effort (BE) which is normal data communication, Guaranteed Burst (GB) which is data communication for burst transfer, and Guaranteed Stream (GS) which is communication of stream data including video data and audio data.

19. A method for performing network communication from a computer to another computer, said computer includes a plurality of network interfaces, and a routing table for storing a plurality of entries each including a final destination network address of a packet, an address of a network interface, and a network address of a gateway to which the packet is to be sent, said method comprising the steps of:
  selecting at least one network interface in response to a request for communication; and
  transmitting said packet to a gateway from the selected network interface based on information contained in said entries of said routing table.

20. A method according to claim 19, wherein said computer further includes quality-of-service (QOS) holding means for holding information concerning the state to be used for each of the network interfaces, wherein said method further comprising the steps of:
  selecting at least one entry where the final destination network address agrees with a network address of another computer out of the entries in the routing table when selecting the network interface;
  comparing a requested service to the information held in the QOS holding means; and
  selecting at least one network interface out of the routing table based on the comparison.

21. A method according to claim 20, further comprising the steps of:
  when said another computer requests said computer to open a communication path, selecting at least one entry where the final destination network address agrees with the network address of said another computer out of the entries of the routing table in accordance with QOS parameters including service class, average traffic, and peak traffic of the communication path specified by said another computer;
  comparing information held in said QOS holding means of the network interface specified by the network interface address of the selected entry of the routing table with the QOS parameters; and
  selecting at least one network interface so that the specified QOS parameters can be satisfied.

22. A method according to claim 20 further comprising the steps of:
  transmitting the address of at least one of the network interfaces selected by said computer to said another computer together with a synchronization (SYN) packet when a communication path is opened between said computer and said another computer.

23. A method according to claim 20, wherein said computer is provided with a LAN switch having a plurality of first communication paths connected to the network interfaces for sending packets from said computer to a public network by bundling the first communication paths and a second communication path, said LAN switch being provided with switching holding means for specifying switching between the first communication paths and the second communication path, wherein said method further comprising the step of:
  directing the LAN switch so that the switching holding means specifies a first communication path selected by said computer.

24. A parallel networking system comprising:
  a first computer which includes a plurality of network interfaces; and
  a second computer connected to a network through a gateway computer,
  wherein said first computer further includes a routing table for storing a plurality of entries each including a final destination network address of a packet, an address of a network interface, and a network address of the gateway computer to which said packet is to be sent, and
  wherein said first computer selects at least one network interrace and sends a packet to the gateway from the selected network interface based on information contained in the entries of the routing table.

25. A parallel networking system according to claim 24, wherein, when said second computer requests said first computer to open a communication path, said first computer selects at least one entry where the final destination network address agrees with the network address of the second computer out of the entries of the routing table, compares QOS holding means of the network interface specified by the network interface address of the entry selected out of the routing table with QOS parameters specified by the second computer, selects at least one network interface so that QOS parameters specified by said second computer can be satisfied, and sends a packet to said gateway of said first computer through the selected network interface.

26. A parallel networking system according to claim 24, wherein said first computer notifies the second computer of the network addresses of all selected network interfaces together with a synchronization (SYN) packet to be transmitted when a communication path is opened.

27. A parallel networking system according to claim 24, wherein when said second computer is provided with a network interface having a large bandwidth data communication is performed by using the network interfaces of said first computer in parallel.

28. A computer program product comprising a computer readable storage medium having a computer program stored thereon and being executable by a server computer in a networking system for performing data communication to a client computer from said server computer having a plurality of network interfaces through a network, wherein a LAN switch is provided between the network and the server computer, said LAN switch having a plurality of communication paths correspondingly connected to the network interfaces of the server computer, any one of said communication paths are usable to connect the client computer with the server computer, said computer program comprising:
  a first group of program execution steps for causing said server computer to select one of said communication paths in accordance with a quality of service (QOS) requested by the client computer; and
  a second group of program execution steps for causing said server computer to select said communication path using information contained in a routing table in the server computer based on a network address of the network connected to the client computer, said routing table having the address of the network connected to the client computer and addresses of network interfaces of the server computer correspondingly connected to said communication path.

29. A computer program product according to claim 28, wherein a QOS control table holding statistical information about virtual-channel bandwidth and dynamic load is provided in the server computer for each of the network interfaces, wherein said computer program further comprises:
   a third group of program execution steps for causing said server computer to refer to the QOS control table when establishment of a communication path is requested.

30. A computer program product according to claim 28, wherein the quality of service (QOS) is composed of three items including a service class, a peak bandwidth, and an average bandwidth, wherein said service class includes at least three kinds of service including Best Effort (BE) which is normal data communication, Guaranteed Burst (GB) which is data communication for burst transfer, and Guaranteed Stream (GSA) which is communication of stream data including video data and audio data.

31. A computer program product according to claim 29, wherein the quality of service (QOS) is composed of three items including a service class, a peak bandwidth, and an average bandwidth, wherein said service class includes at least three kinds of service including Best Effort (BE) which is normal data communication, Guaranteed Burst (GB) which is data communication for burst transfer, and Guaranteed Stream (GS) which is communication of stream data including video data and audio data.

32. A computer program product comprising a computer readable storage medium having a computer program stored thereon and being executed by a computer for performing network communication with another computer, said computer includes a plurality of network interfaces, and a routing table for storing a plurality of entries each including a final destination network address of a packet, an address of a network interface, and a network address of a gateway to which the packet is to be sent, said computer program comprising:
   a group of program execution steps for causing said computer to select at least one network interface in response to a communication request and transmit said packet to a gateway from the selected network interface based on information contained in said entries of said routing table.

33. A computer program product according to claim 32, wherein said computer further includes quality-of-service (QOS) holding means for holding information concerning the state to be used for each of the network interfaces, wherein said computer program further comprises:
   a second group of program execution steps for causing said computer to select at least one entry where the final destination network address agrees with a network address of another computer out of the entries in the routing table when selecting the network interface,
   a third group of program execution steps for causing said computer to compare a requested service to the information held in the QOS holding means, and
   a fourth group of program execution steps for causing said computer to select at least one network interface out of the routing table based on the comparison.

34. A computer program product according to claim 33, further comprising:
   a fifth group of program execution steps for causing said computer to select, when said another compute requests said computer to open a communication path, at least one entry where the final destination network address agrees with the network address of said another computer out of the entries of the routing table in accordance with QOS parameters including service class, average traffic, and peak traffic of the communication path specified by said another computer,
   a sixth group of program execution steps for causing said computer to compare information held in said QOS holding means for the network interface specified by the network interface address of the selected entry of the routing table with the QOS parameters; and
   a seventh group of program execution steps for causing said computer to select at least one network interface so that the specified QOS parameters can be satisfied.

35. A computer program product according to claim 33, further comprising:
   a fifth group of program execution steps for causing said computer to transmit the address of at least one of the network interfaces selected by said computer to said another computer together with a synchronization (SYN) packet when a communication path is opened between said computer and said another computer.

36. A computer program product according to claim 33, wherein said computer is provided with a LAN switch having a plurality of first communication paths connected to the network interfaces for sending packets from said computer to a public network by bundling the first communication paths and a second communication path, said LAN switch being provided with switching holding means for specifying switching between the first communication paths and the second communication path, wherein said computer program further comprises:
   a fifth group of program execution steps for causing said computer to direct the LAN switch so that the switching holding means specifies a first communication path selected by said computer.

37. A parallel networking computer program product comprising a computer readable storage medium having a computer program stored thereon and executable in a networking system having a first computer provided with a plurality of network interfaces and a second computer connected to a network through a gateway computer, said first computer includes a routing table for storing a plurality of entries each including a final destination network address of a packet, an address of a network interface, and a network address of the gateway computer to which said packet is to be sent, said computer program comprising:
   a group of program execution steps for causing said first computer to select at least one network interface in response to a communication request and send a packet to a gateway from the selected network interface based on information contained in the entries of the routing table.

38. A parallel network computer program product according to claim 37, further comprising:
   a second group of program execution steps for causing said first computer, when the second computer requests the first computer to open a communication path, to select at least one entry where the final destination network address agrees with the network address of said second computer out of the entries of the routing table;

a third group of program execution steps for causing the first computer to compare QOS holding means of the network interface specified by the network interface address of the entry selected out of the routing table with QOS parameters specified by said second computer;

a fourth group of program execution steps for causing said first computer to select at least one network interface so that the QOS parameters specified by said second computer can be satisfied; and a fifth group of program execution steps for causing said first computer to send said packet to said gateway of said first computer through the selected network interface.

39. A parallel networking computer program product according to claim 37, further comprising:

a second group of program execution steps for causing said first computer to notify the second computer of the network addresses of all selected network interfaces together with a synchronization (SYN) packet to be transmitted when a communication path is opened.

40. A parallel networking computer program product according to claim 38 further comprising:

a second group of program execution steps for causing said first computer, when said second computer is provided with a network interface having a large bandwidth, to perform data communication by using the network interfaces of said first computer in parallel.

* * * * *